(12) United States Patent
Kato

(10) Patent No.: US 11,796,624 B2
(45) Date of Patent: Oct. 24, 2023

(54) DIRECTION DETECTION DEVICE, METHOD OF ACQUIRING INTENSITY DIFFERENCE TABLE, DIRECTION DETECTION METHOD, AND COMPUTER-READABLE STORAGE MEDIUM

(71) Applicant: MITSUBISHI HEAVY INDUSTRIES, LTD., Tokyo (JP)

(72) Inventor: Noriyasu Kato, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 80 days.

(21) Appl. No.: 17/693,742

(22) Filed: Mar. 14, 2022

(65) Prior Publication Data

US 2022/0334209 A1  Oct. 20, 2022

(30) Foreign Application Priority Data

Apr. 20, 2021 (JP) ................. 2021-071232

(51) Int. Cl.
*G01S 3/06* (2006.01)
*G01S 3/28* (2006.01)
(Continued)

(52) U.S. Cl.
CPC ............. *G01S 3/06* (2013.01); *G01S 3/043* (2013.01); *G01S 3/146* (2013.01); *G01S 3/28* (2013.01); *G01S 3/48* (2013.01)

(58) Field of Classification Search
CPC . G01S 3/06; G01S 3/043; G01S 3/146; G01S 3/28; G01S 3/48
(Continued)

(56) References Cited

U.S. PATENT DOCUMENTS 3,824,595 A  7/1974  Hall
4,638,319 A  1/1987  Chua
(Continued)

FOREIGN PATENT DOCUMENTS

CN  108008347  5/2018
CN  110082711  8/2019
(Continued)

OTHER PUBLICATIONS

Great Britain Office Action dated Sep. 1, 2022 in corresponding Great Britain Patent Application No. GB2203420.1.

*Primary Examiner* — Bo Fan
(74) *Attorney, Agent, or Firm* — Wenderoth, Lind & Ponack L.L.P.

(57) ABSTRACT

A direction detection device includes: antennas that receive a received wave; an intensity difference imparting unit that imparts intensity differences different depending on the received-wave arrival direction to intensities of the received wave; a storage unit that stores an intensity difference table in which the intensity difference between two of the antennas is associated with the received-wave arrival direction, for each combination of any two of the antennas; a detector that detects an intensity difference between the two antennas and a phase difference between the two antennas, of the received wave; an extractor that extracts, from the table, a received-wave arrival direction corresponding to the detected intensity difference, for each combination; a calculation unit that calculates a received-wave arrival direction corresponding to the detected phase difference; and a comparator that compares the extracted received-wave arrival direction with the calculated received-wave arrival direction to acquire a matched received-wave arrival direction.

17 Claims, 16 Drawing Sheets

(51) Int. Cl.
*G01S 3/04* (2006.01)
*G01S 3/14* (2006.01)
*G01S 3/48* (2006.01)

(58) Field of Classification Search
USPC ..... 342/103, 455, 357.16, 96, 354, 464, 442
See application file for complete search history.

(56) References Cited

U.S. PATENT DOCUMENTS

| 8,798,638 | B2* | 8/2014 | Lane | H04W 4/029 |
| | | | | 455/456.2 |
| 10,054,449 | B2* | 8/2018 | Calmettes | G01S 19/14 |
| 10,877,158 | B2* | 12/2020 | Grant | H04B 7/195 |

FOREIGN PATENT DOCUMENTS

| JP | 2005-164328 | 6/2005 |
| JP | 2010-133907 | 6/2010 |

* cited by examiner

A-A

B-B

DIRECTION DETECTION DEVICE, METHOD OF ACQUIRING INTENSITY DIFFERENCE TABLE, DIRECTION DETECTION METHOD, AND COMPUTER-READABLE STORAGE MEDIUM

CROSS-REFERENCE TO RELATED APPLICATIONS

The present application claims priority to and incorporates by reference the entire contents of Japanese Patent Application No. 2021-071232 filed in Japan on Apr. 20, 2021.

FIELD

The present disclosure relates to a direction detection device for detecting a received-wave arrival direction, a method of acquiring an intensity difference table, a direction detection method, and a computer-readable storage medium.

BACKGROUND

Conventionally, as direction detection devices, angle measurement processing devices have been known that calculate the arrival direction of signals of received wave or the like (refer to Patent Literature 1, for example). The angle measurement processing device includes a plurality of antenna elements and a radome that covers the antenna elements. The angle measurement processing device calculates an arrival direction of an incoming signal using the incoming signals received by the antenna elements.

CITATION LIST

Patent Literature

Patent Literature 1: Japanese Patent Application Laid-open No. 2010-133907

SUMMARY

Technical Problem

When the received-wave arrival direction is detected using a phase difference between a plurality of antennas, ambiguity may occur. Ambiguity is a phenomenon that a plurality of candidates for the received-wave arrival direction are calculated in accordance with a relation between a distance between the antennas, and a wavelength of the received wave, even if the phase difference acquired between the antennas is the same. The ambiguity that occurs changes according to the distance between the antennas. Thus, in order to eliminate the ambiguity, it is common to use the plurality of the antennas in which the distances between the antennas are unequal.

When a plurality of the antennas are lined up in one direction (for example, in the azimuth direction (also known as AZ direction)), the antennas can detect the received-wave arrival direction in a plane (two-dimensional) that includes one direction. Thus, in order to detect a three-dimensional received-wave arrival direction, it is necessary to line up the antennas in one direction and also line up in another direction that intersects the one direction (for example, in an elevation angle direction (also known as EL direction)), that is, it is necessary to array the antennas in a two-dimensional manner.

However, the antennas installed in the inner space of the radome may be difficult to be arrayed in a two-dimensional manner due to spatial restrictions of the radome, in some cases. When the antennas are lined up in only one dimensional direction due to the spatial restrictions of the radome, the received-wave arrival direction in the plane including that direction can be calculated from the phase difference between the antennas, but in the other direction intersecting the one direction, the received-wave arrival direction cannot be calculated using the phase difference because there are no plurality of the antennas.

Thus, the present disclosure addresses the problem of providing a direction detection device, a method of acquiring an intensity difference table, a direction detection method, and a computer-readable storage medium that can detect the received-wave arrival direction in a suitable manner while removing ambiguity, even if there are restrictions on the installation of antennas in the radome.

Solution to Problem

A direction detection device according to one aspect of the present disclosure is for detecting a received-wave arrival direction of a received wave. The direction detection device includes: a plurality of antennas that receive the received wave; an intensity difference imparting unit that imparts intensity differences different depending on the received-wave arrival direction to intensities of the received wave to be received at the antennas; a storage unit that stores an intensity difference table in which the intensity difference between two of the antennas is associated with the received-wave arrival direction, for each combination of any two of the antennas; a detector that detects an intensity difference between the two antennas and a phase difference between the two antennas, of the received wave to be received at the antennas; an extractor that extracts, from the intensity difference table stored in the storage unit, a received-wave arrival direction corresponding to the intensity difference detected by the detector, for each combination of any two of the antennas; a calculation unit that calculates a received-wave arrival direction corresponding to the phase difference detected by the detector; and a comparator that compares the received-wave arrival direction extracted by the extractor with the received-wave arrival direction calculated by the calculation unit to acquire a matched received-wave arrival direction as a detection result.

A method according to another aspect of the present disclosure is of acquiring the intensity difference table used in the direction detection device described above. The method includes: setting up a radio wave source for generating the received wave so that the received wave is in a predetermined arrival direction with respect to the plurality of antennas; causing the radio wave source to generate the received wave; receiving the received wave by the antennas; and acquiring the intensity difference table in which an intensity difference of the received wave between two of the antennas is associated with a received-wave arrival direction.

A direction detection method according to still another aspect of the present disclosure is of detecting a received-wave arrival direction of a received wave by the direction detection device described above. The method includes: receiving the received wave by the plurality of antennas; detecting, by the detector, an intensity difference between the two antennas and a phase difference between the two antennas, of the received wave to be received by the antennas; extracting, by the extractor, from the intensity difference table stored in the storage unit, a received-wave arrival direction corresponding to the intensity difference detected by the detector, for each combination of any two of the antennas; calculating, by the calculation unit, a received-wave arrival direction corresponding to the phase difference detected by the detector; and comparing, by the comparator, the received-wave arrival direction extracted by the extractor with the received-wave arrival direction calculated by the calculation unit to acquire a matched received-wave arrival direction as a detection result.

A non-transitory computer-readable storage medium according to yet another aspect of the present disclosure stores a direction detection program for detecting a received-wave arrival direction of a received wave. The direction detection program, when executed by a computer of the direction detection device described above, causes the direction detection device to: receive the received wave by the plurality of antennas; detect an intensity difference between the two antennas and a phase difference between the two antennas, of the received wave to be received by the antennas; extract, from the intensity difference table stored in the storage unit, a received-wave arrival direction corresponding to the detected intensity difference, for each combination of any two of the antennas; calculate a received-wave arrival direction corresponding to the phase difference detected by the detector; and compare the extracted received-wave arrival direction with the calculated received-wave arrival direction to acquire a matched received-wave arrival direction as a detection result.

Advantageous Effects of Invention

According to the present disclosure, it is possible to suitably detect the received-wave arrival direction in three dimensions that could not be conventionally acquired while removing ambiguity, even if there are restrictions on the installation of antennas in the radome.

DESCRIPTION OF EMBODIMENTS

The following describes in detail the embodiments according to the present disclosure on the basis of the drawings. The invention is not limited by these embodiments. The components in the following embodiments include those replaceable and easy to be replaced by those skilled in the art, or those that are substantially the same. Furthermore, the components described below can be combined as appropriate, and if there are more than one embodiment, each of the embodiments can be combined one another. It should be noted that the "intensity difference" as used herein may refer to a ratio of intensities as well as a difference between intensities. The unit of values in the cells of the intensity difference table in FIG. 5 described later is actually dB in which a difference between the received intensities at two antennas results in a ratio of the two intensities in a mathematical operation.

First Embodiment

A direction detection device 1 and a direction detection method according to the first embodiment are a device and a method for detecting a received-wave arrival direction. The received wave is a radio wave, for example, a beam of a detection radar. The direction detection device 1 is disposed in transportation machinery such as aircraft, vehicles, or ships, for example. The received-wave arrival direction is determined by the angle (AZ angle) in the azimuth direction (hereinafter referred to as AZ) and the angle (EL angle) in the elevation direction (hereinafter referred to as EL).

Figure 1:
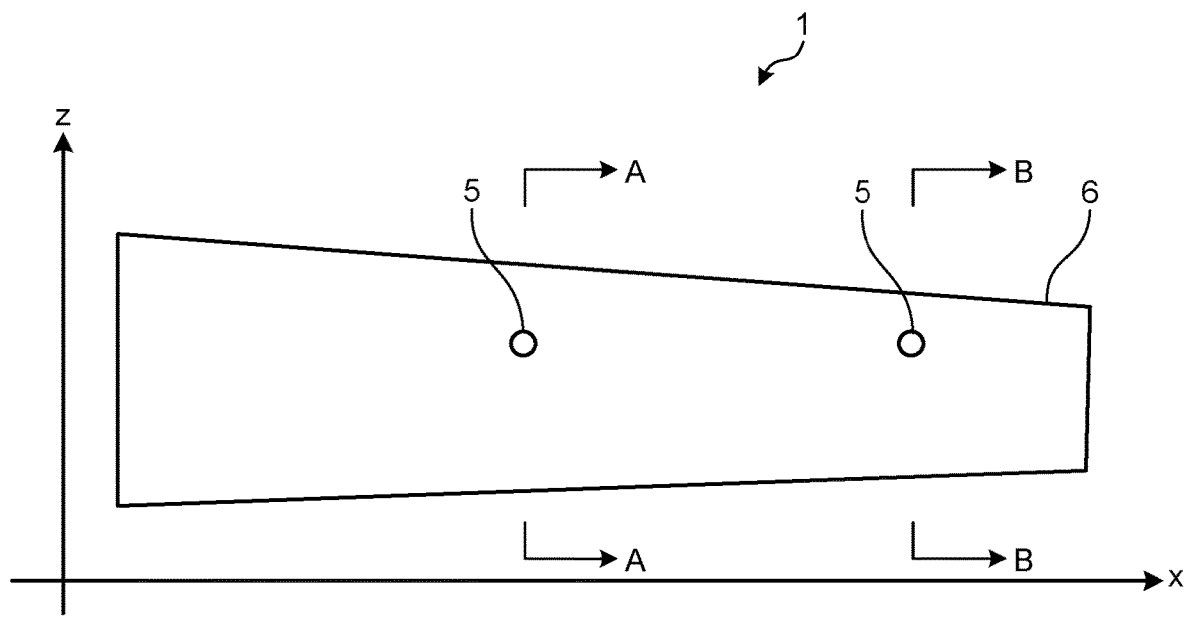
FIG. 1 is a schematic diagram of part of the direction detection device according to a first embodiment.
Figure 2:
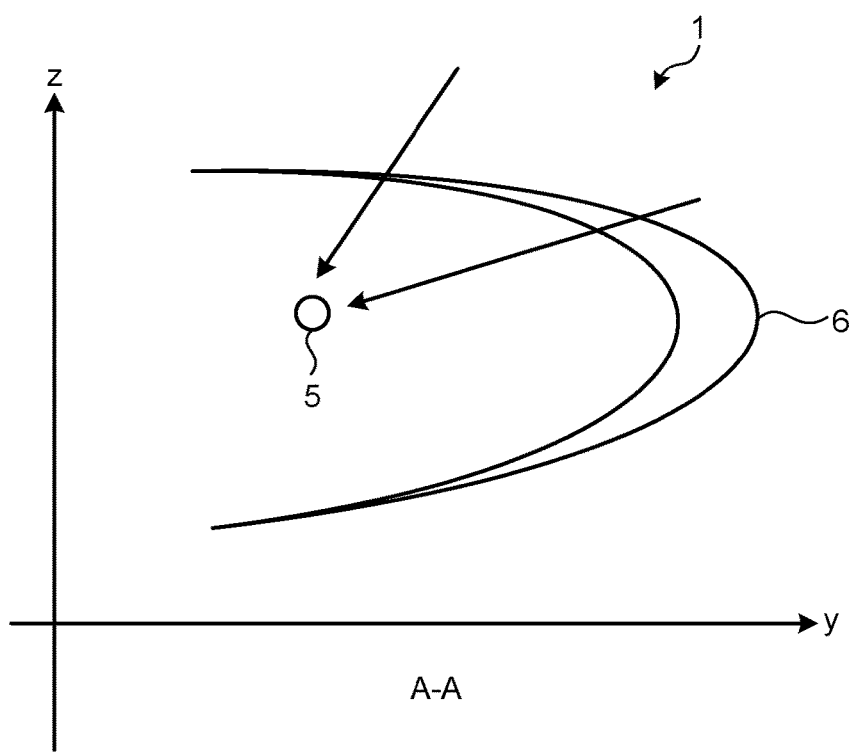
FIG. 2 is an A-A cross-section of FIG. 1.
Figure 3:
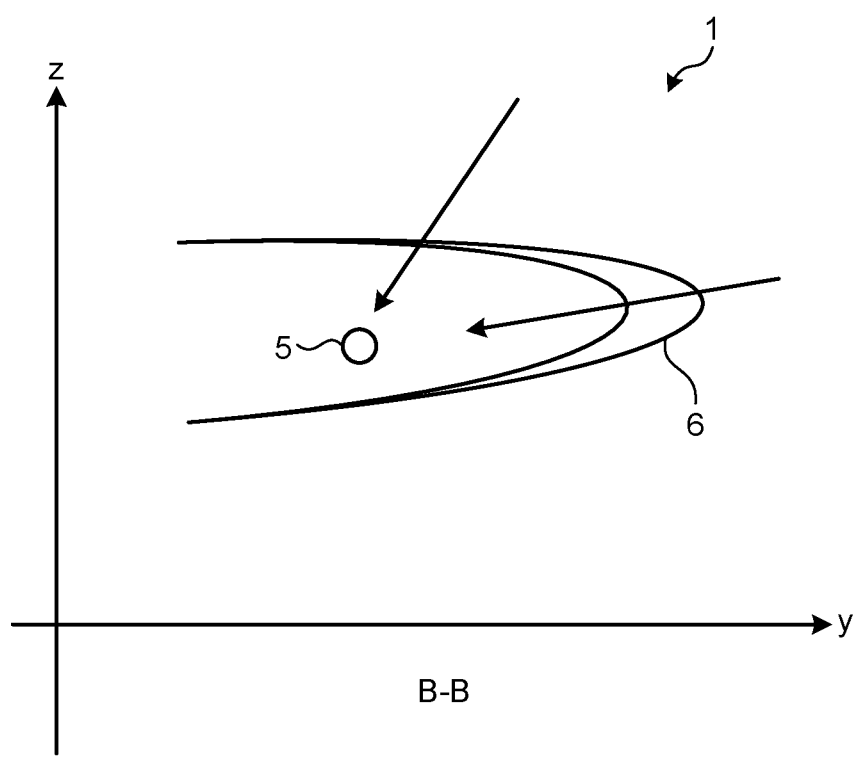
FIG. 3 is a B-B cross-section of FIG. 1.
Figure 4:
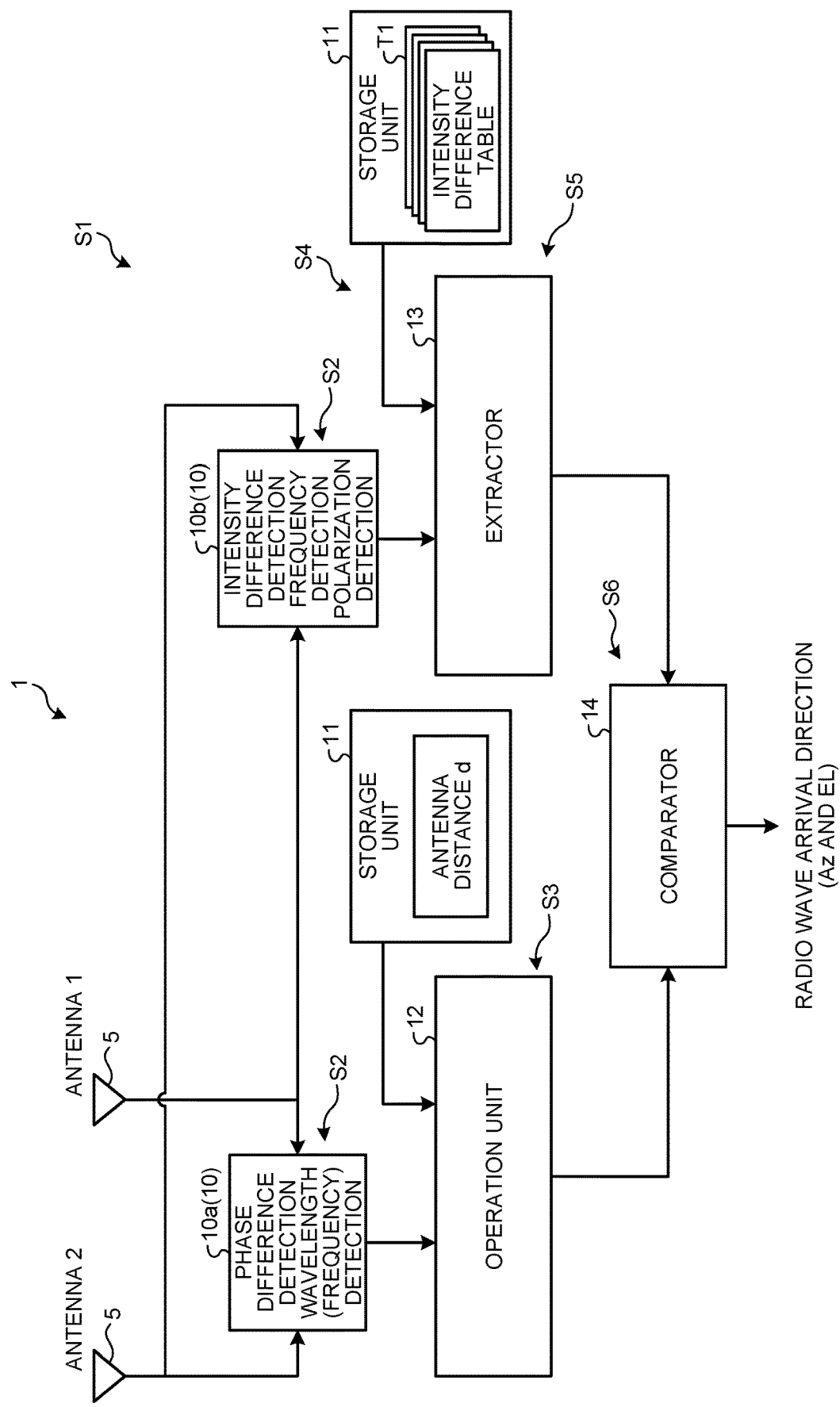
FIG. 4 is an explanatory diagram relating to the direction detection device and a direction detection method according to the first embodiment.
Figure 5:
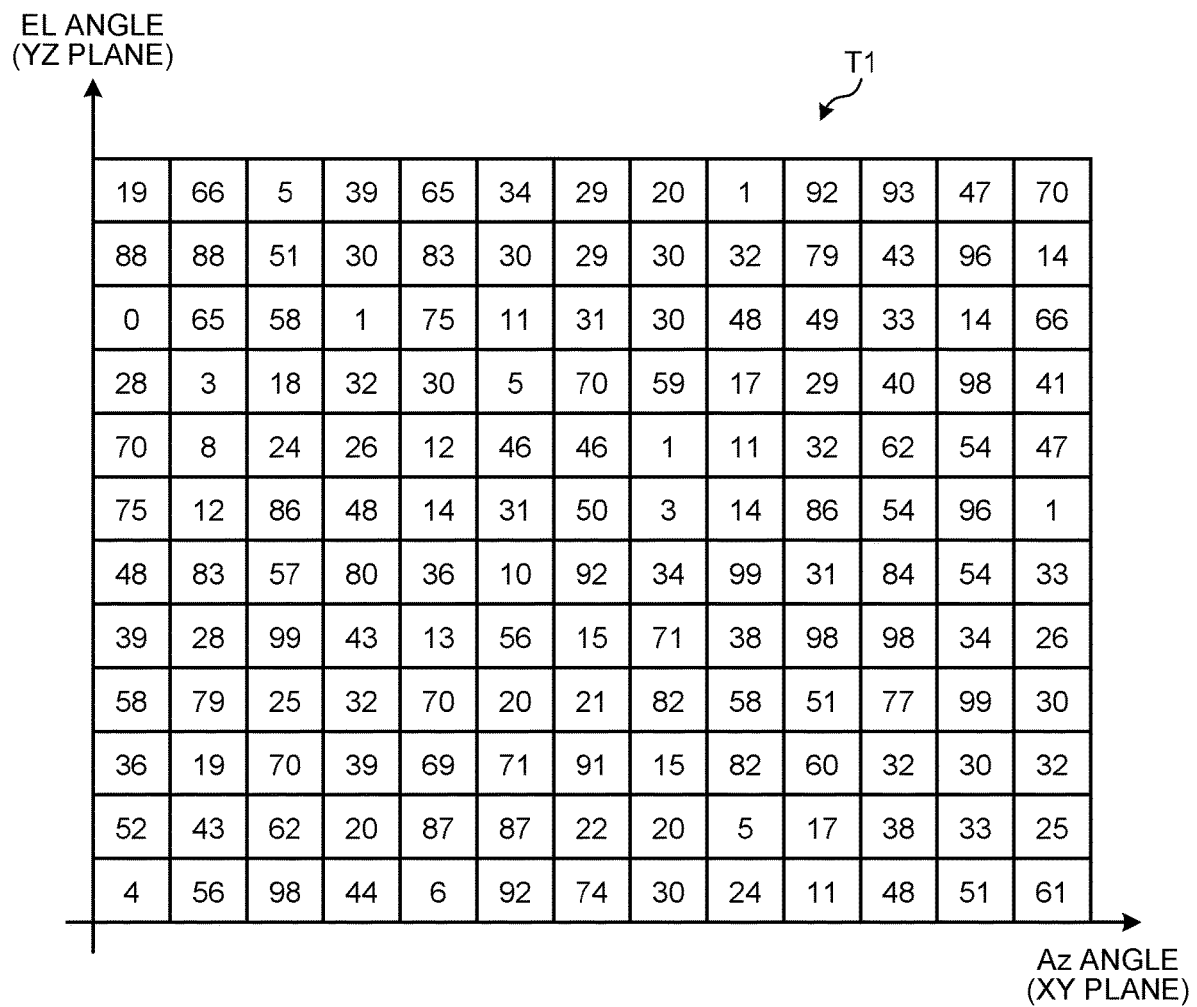
FIG. 5 is a diagram of an intensity difference table.
Figure 6:
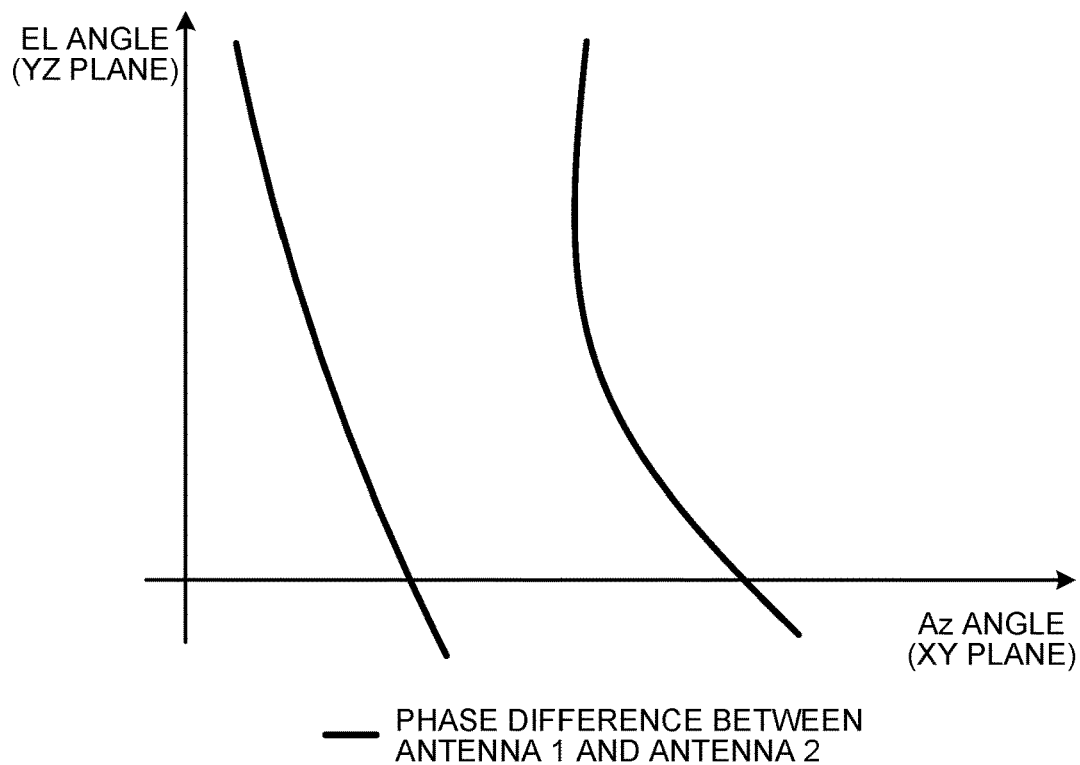
FIG. 6 is a graph indicating an example of an arrival direction based on a phase difference.
Figure 7:
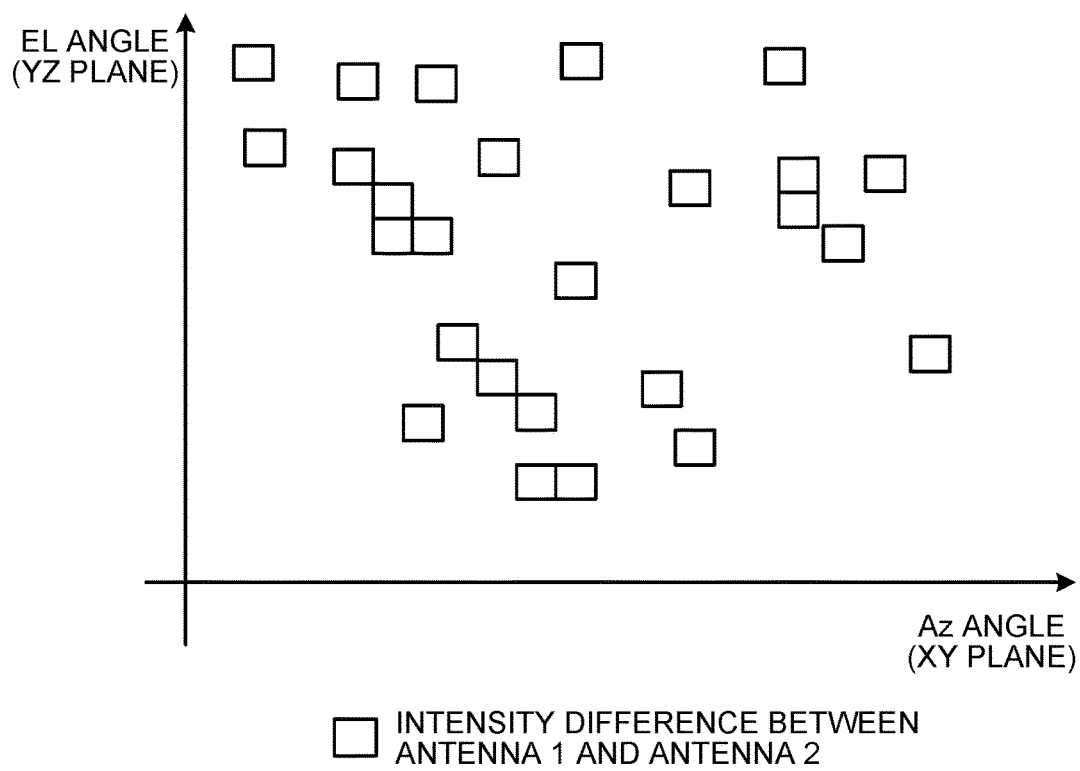
FIG. 7 is a graph indicating an example of extraction from the intensity difference table.
Figure 8:
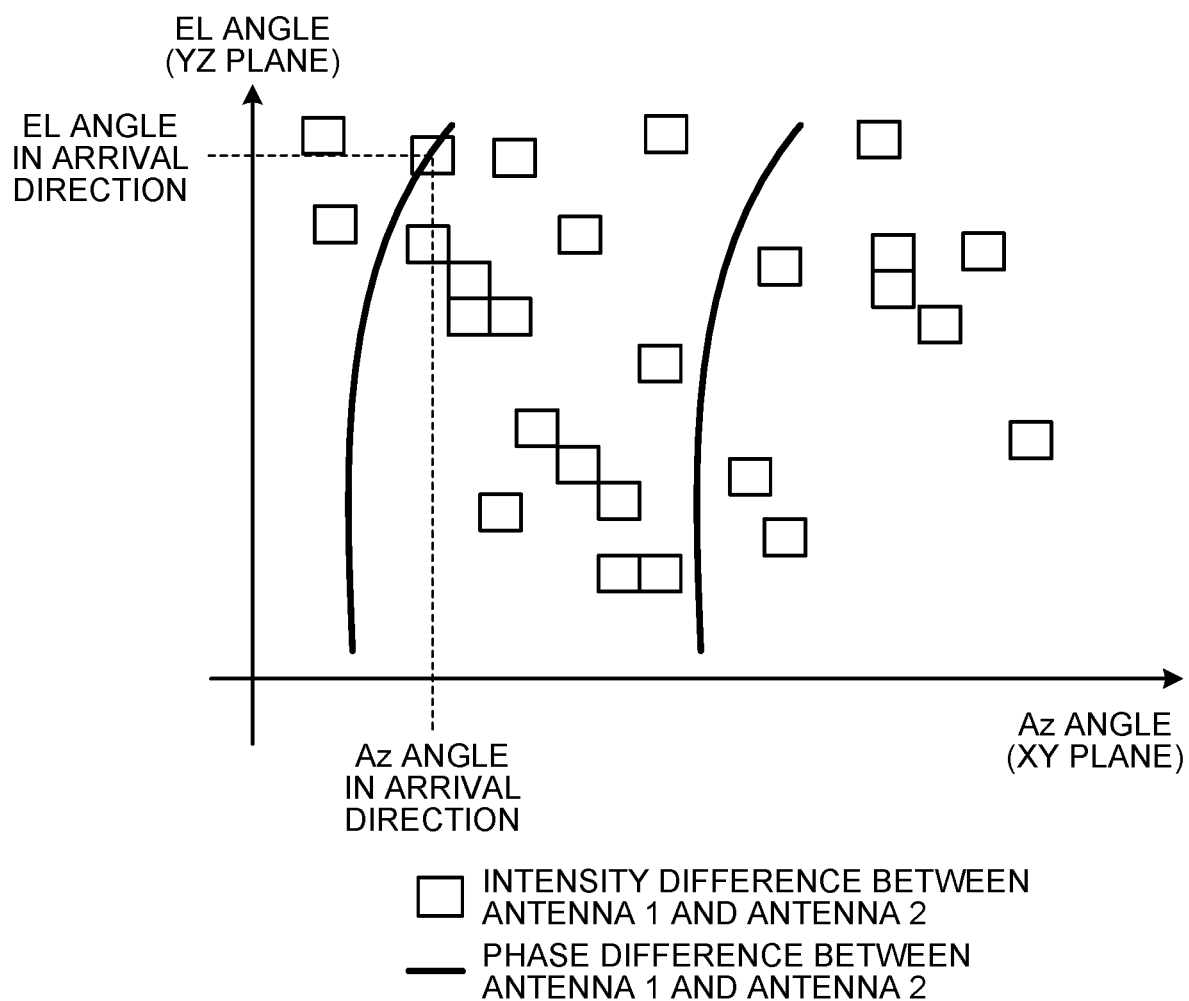
FIG. 8 is a graph on which candidates for a received-wave arrival direction are superimposed.

FIG. 1 is a schematic diagram of part of the direction detection device according to the first embodiment. FIG. 2 is an A-A cross-sectional view of FIG. 1. FIG. 3 is a B-B cross-sectional view of FIG. 1. FIG. 4 is an explanatory diagram relating to the direction detection device and the direction detection method according to the first embodiment. FIG. 5 is a diagram of an intensity difference table. FIG. 6 is a graph indicating an example of the arrival direction based on a phase difference. FIG. 7 is a graph indicating an example of extraction from the intensity difference table. FIG. 8 is a graph on which candidates for a received-wave arrival direction are superimposed.

Direction Detection Device

As illustrated in FIGS. 1 to 3, the direction detection device 1 includes a plurality of antennas 5 and a radome 6. The antennas 5 are disposed in a linear fashion along the AZ direction (x-direction in FIG. 1) and are disposed at one location in the EL direction (z-direction in FIGS. 1 to 3), thereby having a one-dimensional arrangement. Although the first embodiment has the one-dimensional arrangement so as to suppress a height in the EL direction, arrangement is not particularly limited. The number of the antennas 5 are at least two, and in the first embodiment, explanation is made using two antennas 5. The antennas 5 are arranged at predetermined distances in the AZ direction.

The radome 6 is disposed on a wing of an aircraft, for example. The radome 6 functions as the intensity difference imparting unit that imparts intensity differences different depending on the received-wave arrival direction to an intensity difference of a signal intensity between the antennas 5. Note that the AZ direction is a wing span direction of the wing of the aircraft. Specifically, the radome 6 has a shape that is non-uniform in a three-dimensional space including the AZ and EL directions. As illustrated in FIG. 2, a cross-sectional shape of the radome 6 cut at a position of a wing root side (left side of FIG. 1) in the AZ direction is such that the inner space is wider in the EL direction. In contrast, as illustrated in FIG. 3, a cross-sectional shape of the radome 6 cut at a position of a wing tip side (right side in FIG. 1) is such that the inner space is narrower in the EL direction. In a cross section also indicated in FIGS. 2 and 3, the thickness of the radome 6 is not constant, varying depending on the EL direction.

The radome 6 has a structure that is a laminate configuration, and the radome 6 may have different shapes, different laminate configurations, or both different shapes and laminate configurations so as to impart intensity differences different depending on the received-wave arrival direction.

As illustrated in FIG. 4, the direction detection device 1 includes a detector 10, a storage unit 11, an operation unit 12, an extractor 13, and a comparator 14.

The detector 10 is connected to the two antennas 5 and has a detection unit 10a that detects the phase difference and a detection unit 10b that detects the intensity difference. The detection unit 10a detects the phase difference and a frequency of the received wave to be received by the two antennas 5. The detection unit 10a also calculates a wavelength from the detected frequency. The detection unit 10b detects the intensity difference, the frequency, and a polarization of the received wave to be received by the two antennas 5. Information about the polarizations may be acquired from an intensity ratio of two orthogonal linear antennas or from measurement in which one linear antenna is rotated. In this case, an antenna dedicated to detecting the polarizations may be separately disposed. Here, in the first embodiment, as the two antennas 5, "Antenna 1", and "Antenna 2" are applied. In other words, in the first embodiment, the detection unit 10b detects the intensity difference between the "Antenna 1" and the "Antenna 2", as the intensity difference between the two antennas 5. The detection unit 10b detects the intensity difference, the frequency, and the polarization, but it is sufficient to detect at least the intensity difference, and if necessary, the frequency and the polarization may be detected.

The storage unit 11 stores therein a distance d between the two antennas 5 and the intensity difference table T1 illustrated in FIG. 5. The distance d between the antennas 5 and the intensity difference table T1 may be stored in a storage unit 11 that is separate as shown in FIG. 4, or may be stored in a storage unit 11 that is integrated, that is, a type of storage is not particularly limited. The distance d between the antennas 5 is the distance between the "Antenna 1" and the "Antenna 2", and is a fixed value that is specified at the time of installation.

The intensity difference table T1 is data in which the intensity difference between the two antennas 5 is associated with the received-wave arrival directions. In FIG. 5, the horizontal axis is the AZ angle and the vertical axis is the EL angle. The intensity difference table T1 consists of a plurality of cells associated with the AZ and EL angles. Each cell has an intensity difference associated therewith. Therefore, the AZ and EL angles are associated with the cells with which the intensity differences are associated. The intensity difference table T1 is prepared at least for each frequency or each polarization, and an intensity difference table T1 corresponding to frequency, an intensity difference table T1 corresponding to polarization, or an intensity difference table T1 corresponding to frequency and polarization may be prepared. The first embodiment prepares, as the intensity difference tables T1, the intensity difference table T1 of the "Antenna 1" and the "Antenna 2". Although not illustrated in a figure, the storage unit 11 stores therein a computer program for detecting the received-wave arrival direction using the direction detection device 1. The intensity difference table T1 includes not only the intensity difference table T1 illustrated in FIG. 5, but also mathematical expressions based on the intensity difference table T1 illustrated in FIG. 5.

The operation unit 12 calculates the received-wave arrival direction from a predetermined calculation expression using the phase difference $\Delta\theta$ and the wavelength $\lambda$ of the received wave detected in the detection unit 10a of the detector 10 and the distance d between the antennas 5 acquired from the storage unit 11. Here, the predetermined calculation expression is a commonly known method of phase difference direction finding, which uses "$\theta=\sin^{-1}(\Delta\theta\cdot\lambda/2\pi d)$" or the like.

The extractor 13 extracts the received-wave arrival direction corresponding to the intensity difference from the intensity difference table T1 of the "Antenna 1" and the "Antenna 2", using the frequency, the polarization, and the intensity difference of the received wave detected in the detection unit 10b of the detector 10. Specifically, in the first embodiment, the extractor 13 acquires, if necessary, the intensity difference table T1 corresponding to the frequency, the intensity difference table T1 corresponding to the polarization, or the intensity difference table T1 corresponding to the frequency and the polarization, using the frequency and the polarization of the received wave detected at the detection unit 10b. After this, the extractor 13 extracts the cells in the intensity difference table T1 corresponding to the intensity differences detected in the detection unit 10b.

The comparator 14 acquires the arrival direction calculated in the operation unit 12, and the received-wave arrival direction in which a plurality of candidates for the arrival direction extracted by the extractor 13 match, as a detection result. Now, referring to FIGS. 6 to 8, the following specifically describes processing by the comparator 14. FIG. 6 is a diagram of a graph indicating changes in the arrival direction at a predetermined phase difference calculated using a predetermined calculation expression. In FIG. 6, the arrival direction in the phase difference $\Delta\theta$ between the "Antenna 1" and the "Antenna 2" is illustrated as an example. On the other hand, FIG. 7 is a diagram where cells with the same value of the intensity difference are extracted in the intensity difference table T1 as illustrated in FIG. 5.

FIG. 7 is a diagram where cells with the intensity difference ΔE between the "Antenna 1" and the "Antenna 2" are extracted.

The comparator 14 acquires the arrival direction based on the phase difference Δθ between the "Antenna 1" and the "Antenna 2" acquired by the operation unit 12, as illustrated in FIG. 6. The comparator 14 also acquires candidate cells for the arrival direction based on the intensity difference ΔE between the "Antenna 1" and the "Antenna 2" as illustrated in FIG. 7. Then, the comparator 14 superimposes, as illustrated in FIG. 8, cells that fall within the arrival direction based on the phase difference Δθ between the "Antenna 1" and the "Antenna 2" on cells that fall within the intensity difference ΔE between the "Antenna 1" and the "Antenna 2", so as to acquire cells that match. The comparator 14 then acquires the AZ and EL angles corresponding to the acquired cells as detection results. In other words, the azimuth indicated by the combination of the AZ and EL angles indicated by the cells that match one another is an azimuth that causes the "Antenna 1" and the "Antenna 2" to generate the phase difference Δθ and also causes the "Antenna 1" and the "Antenna 2" to generate the intensity difference ΔE, and matches an observation result, so that it is possible to estimate the azimuth as the received-wave arrival direction.

Figure 9:
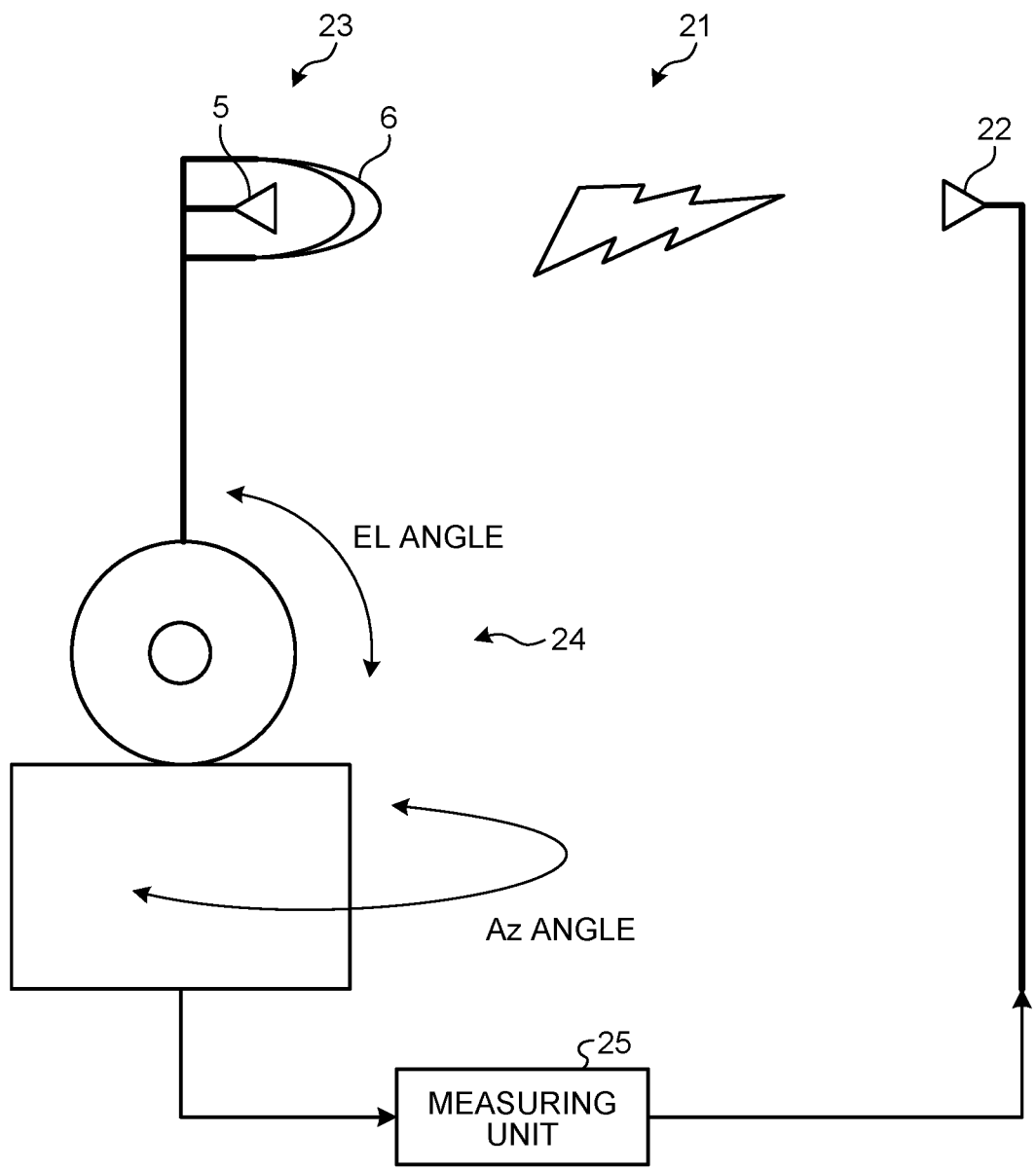
FIG. 9 is a schematic diagram of equipment used in a method of acquiring the intensity difference table.

Intensity difference table acquisition method Next, referring to FIG. 9, the following describes the method of acquiring the intensity difference table that is to acquire the intensity difference table T1 used in the direction detection device 1. An acquisition device 21 illustrated in FIG. 9 is used to acquire the intensity difference table T1. The acquisition device 21 includes a transmitter 22, a receiver 23, an operating unit 24, and a measuring unit 25.

The transmitter 22 transmits radio waves that will become predetermined polarizations toward the receiver 23. The receiver 23 is a receiver that mimics the antennas 5 and the radome 6 of the direction detection device 1, and acquires radio waves that the receiver 23 has received as received waves. The operating unit 24 moves the receiver 23 so that the position of the transmitter 22 viewed from the receiver 23 is at the predetermined AZ and EL angles. The measuring unit 25 sets a transmission frequency of the transmitter 22 and acquires the intensity difference of the received wave to be received at the receiver 23, and also acquires the AZ angle and the EL angle at the time of the acquisition.

The method of acquiring the intensity difference table T1 executes a step of causing the receiver 23 including the two antennas 5 to operate the operating unit 24 so that the arrival direction has the predetermined AZ and EL angles. Thereafter, in this method, a step is executed in which a radio wave of a predetermined frequency is generated from the transmitter 22 serving as a radio wave source. This method then executes a step of receiving the radio wave of the predetermined frequency by the receiver 23, as a received wave. In this method, when the receiver 23 receives the received wave, the measuring unit 25 measures the intensity difference of the received wave. Then, in this method, a step is executed in which the measured intensity difference between the two antennas 5 is associated with the AZ and EL angles at the time of acquisition, and an intensity difference table T1 is acquired for each frequency and each polarization of the received wave. In the above-described method of acquiring the intensity difference table T1, the intensity difference table T1 is acquired for each frequency and each polarization of the received wave, but the intensity difference table T1 may be acquired only for each frequency or each polarization.

A plurality of the intensity difference tables T1 prepared for each frequency or each polarization of the received waves may undergo an interpolation process in which the intensity difference between the frequencies or the polarizations is interpolated. Furthermore, each cell in the intensity difference table T1 is associated with an arrival direction consisting of the AZ and EL angles, but an interpolation process may be performed in which the AZ and EL angles between cells are interpolated.

Direction Detection Method

Next, referring to FIG. 4, the following describes the direction detection method for detecting the received-wave arrival direction by the direction detection device 1.

The direction detection method first executes step S1 in which the two antennas 5 receive received waves. Thereafter, in the direction detection method, step S2 is executed in which the detector 10 detects the phase difference and the intensity difference between the two antennas 5 using the received waves received by the two antennas 5. In step S2, the detection unit 10a detects the phase difference between the two antennas 5 and frequency, and the detection unit 10b detects the intensity difference between the two antennas 5 and, if necessary, the frequency or the polarization. The direction detection method then executes step S3, which calculates the received-wave arrival direction corresponding to the phase difference from a predetermined calculation expression using the detected phase difference and wavelength, and the distance d between the antennas 5 acquired from the storage unit 11. Next, in the direction detection method, step S4 is executed in which the extractor 13 acquires the intensity difference table T1 corresponding to the frequencies or polarizations, from the storage unit 11, using the detected frequencies or the polarizations. Then, in the direction detection method, step S5 is executed in which the extractor 13 extracts, from the acquired intensity difference table T1, cells corresponding to the received-wave arrival direction corresponding to the intensity difference detected by the detector 10, that is, corresponding to the AZ angle and the EL angle. In the direction detection method, after the execution of step S5, step S6 is executed in which the comparator 14 compares the received-wave arrival direction corresponding to the phase difference calculated at step S3 and the acquired cells of the AZ and EL angles, and acquires the AZ and EL angles of the cells that match as the detection results. In the direction detection method of the first embodiment, the cells are acquired from the corresponding intensity difference table T1 on the basis of the frequencies or the polarizations, but the cells may be acquired from the corresponding intensity difference table T1 on the basis of the frequencies and the polarizations.

Second Embodiment

Figure 10:
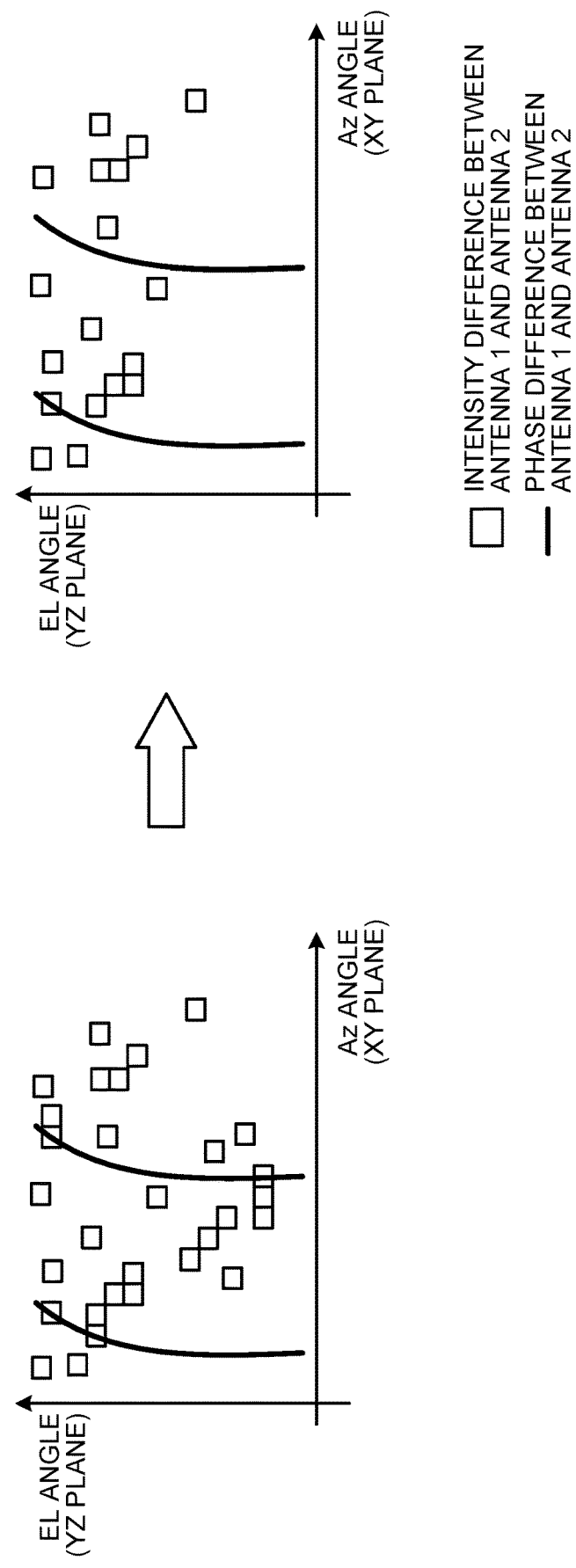
FIG. 10 is an explanatory diagram of an example relating to a direction detection device and a direction detection method according to a second embodiment.
Figure 11:
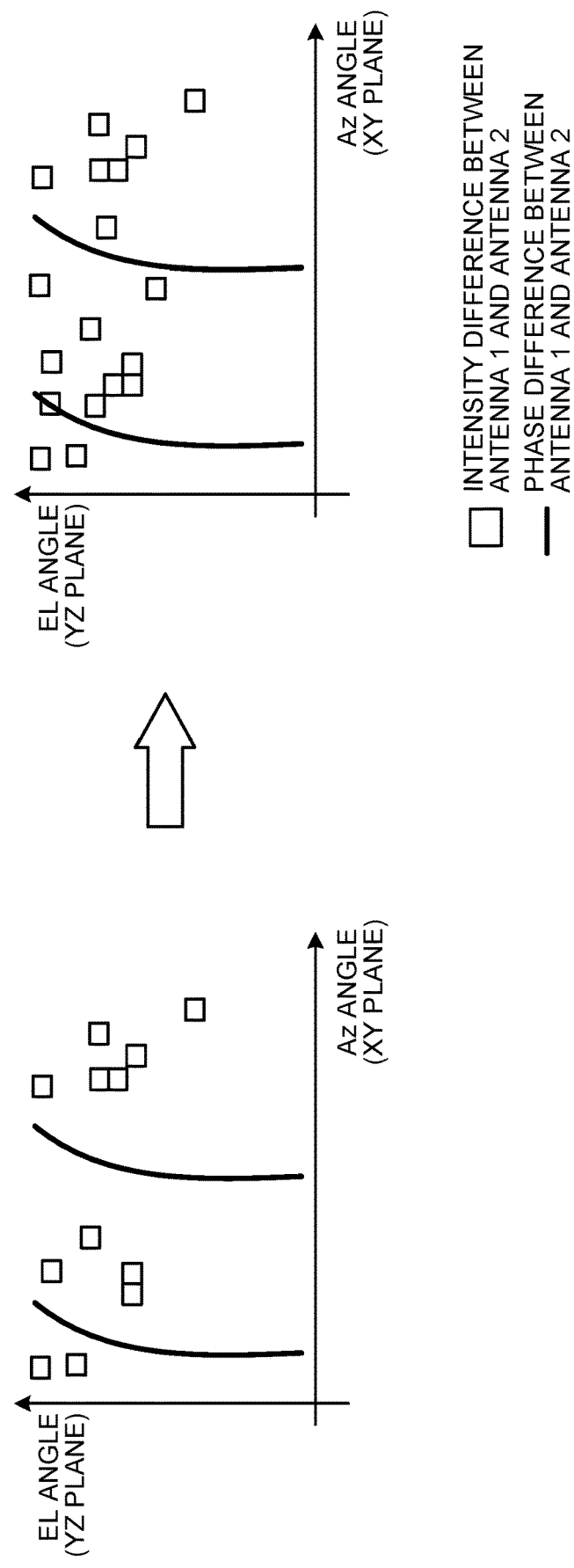
FIG. 11 is an explanatory diagram of an example relating to the direction detection device and the direction detection method according to the second embodiment.

Next, referring to FIGS. 10 and 11, the following describes the second embodiment. In order to avoid duplicate descriptions, part of the second embodiment that is different from the first embodiment is described, and part that has the same configuration as the first embodiment will be described with the same symbol. FIGS. 10 and 11 are explanatory diagrams of an example relating to a direction detection device and a direction detection method according to the second embodiment.

In the direction detection method of the first embodiment, the extractor 13 extracts the cells corresponding to the intensity difference detected by the detection unit 10b of the detector 10. In this case, there may be more than one cell that match in the comparator 14, as illustrated on the left side of FIG. 10. In the comparator 14, there may be no cell that matches as illustrated on the left side of FIG. 11.

Thus, in the direction detection method of the second embodiment, the extractor 13 extracts the received-wave arrival direction corresponding to the intensity difference width obtained by imparting a first adjustment width ($\alpha$, $\beta$) to the intensity difference 6E detected by the detector 10. Specifically, the extractor 13 acquires, when acquiring the intensity difference $\Delta E$ from the detector 10, generates "$\Delta E - \alpha \Delta E < \Delta E + \beta$" as the intensity difference width and acquires a cell corresponding to the generated intensity difference width. Here, the extractor 13 reduces the number of cells to be acquired by decreasing a first adjustment width ($\alpha$, $\beta$), or increases the number of cells to be acquired by increasing the first adjustment width ($\alpha$, $\beta$).

Specifically, as illustrated on the left side of FIG. 10, when the comparator 14 compares the received-wave arrival direction corresponding to the phase difference and the cells that fall within the intensity difference width between the "Antenna 1" and the "Antenna 2", the extractor 13 narrows the intensity difference width. This narrowing reduces the number of the cells that fall within the intensity difference width between the "Antenna 1" and the "Antenna 2". Then, the comparator 14 again compares the received-wave arrival direction corresponding to the phase difference and the cells that fall within the intensity difference width between the "Antenna 1" and the "Antenna 2", so as to be able to find cells that match, as illustrated on the right side of FIG. 10.

As illustrated on the left side of FIG. 11, when the comparator 14 compares the received-wave arrival direction corresponding to the phase difference and the cells that fall within the intensity difference width between the "Antenna 1" and the "Antenna 2", resulting in no cells that match, that is, the cells are inconsistent, the extractor 13 widens the intensity difference width. This widening increases the number of cells that fall within the intensity difference width between the "Antenna 1" and the "Antenna 2". Then, the comparator 14 again compares the received-wave arrival direction corresponding to the phase difference and the cells that fall within the intensity difference width between the "Antenna 1" and the "Antenna 2", so as to be able to find cells that match, as illustrated on the right side of FIG. 11.

Third Embodiment

Figure 12:
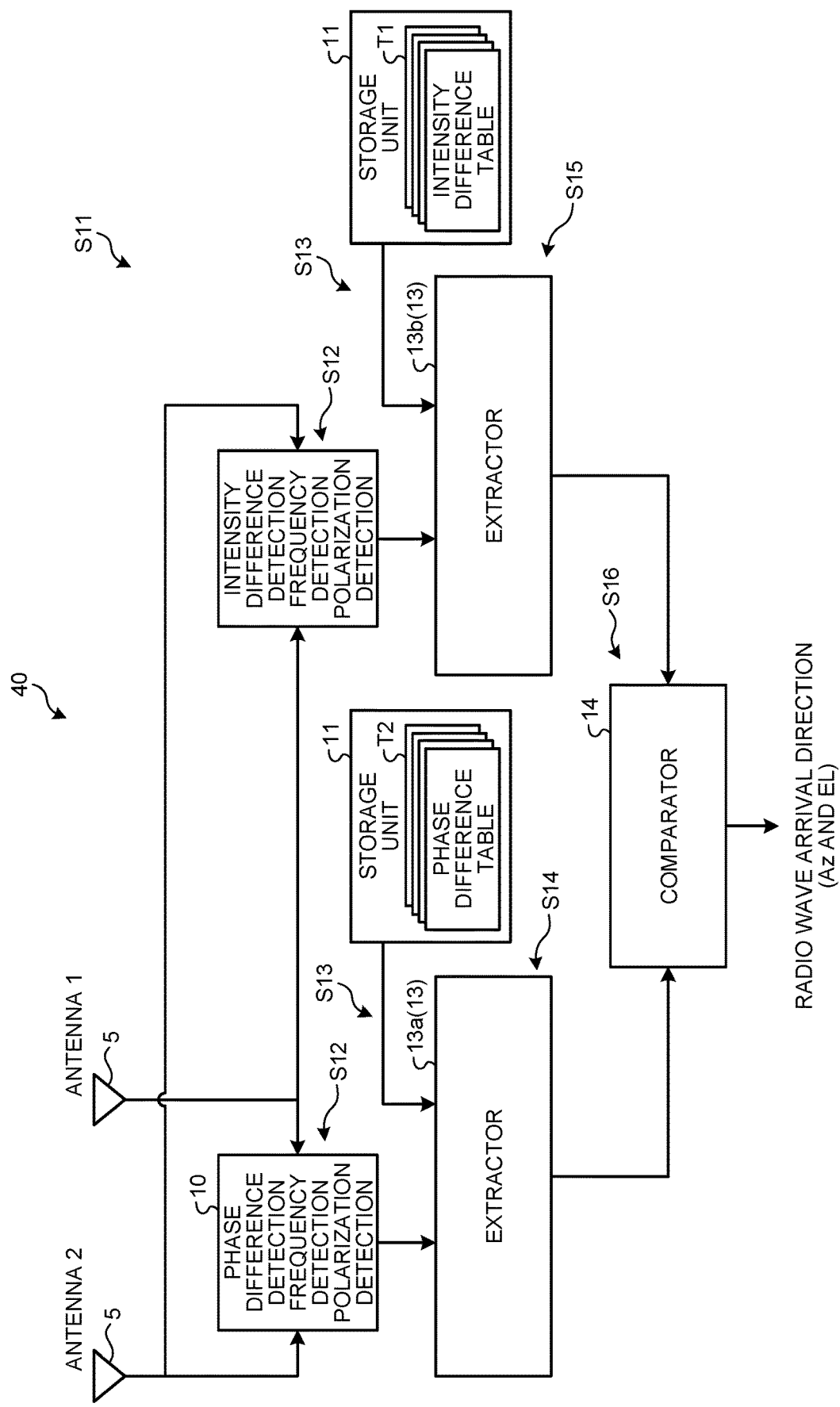
FIG. 12 is an explanatory diagram relating to the direction detection device and the direction detection method according to a third embodiment.
Figure 13:
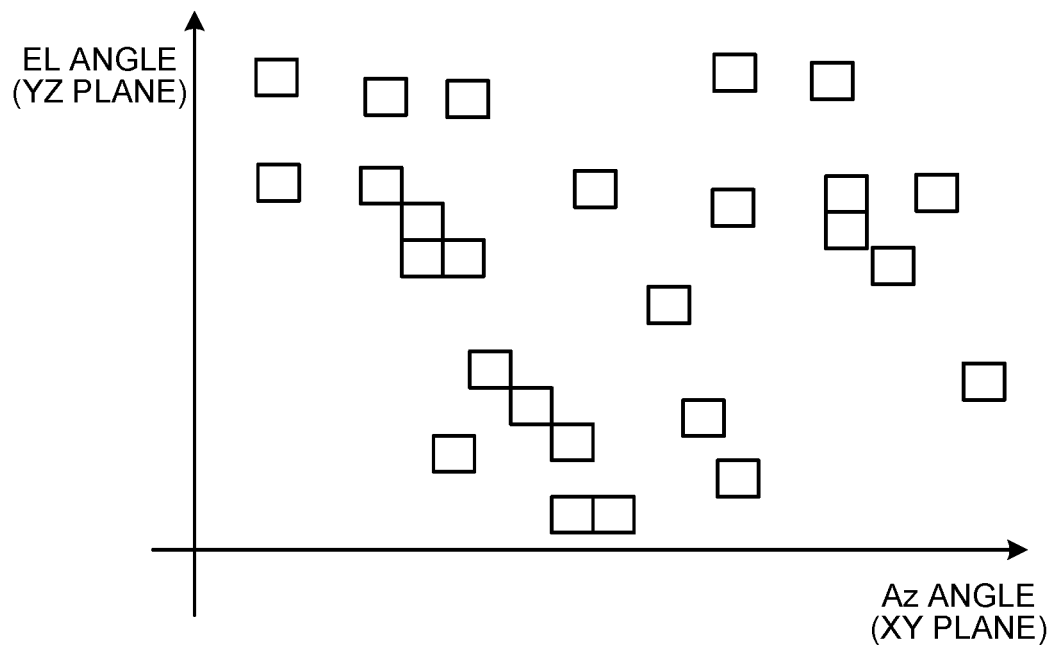
FIG. 13 is a graph indicating an example of extraction from a phase difference table.
Figure 14:
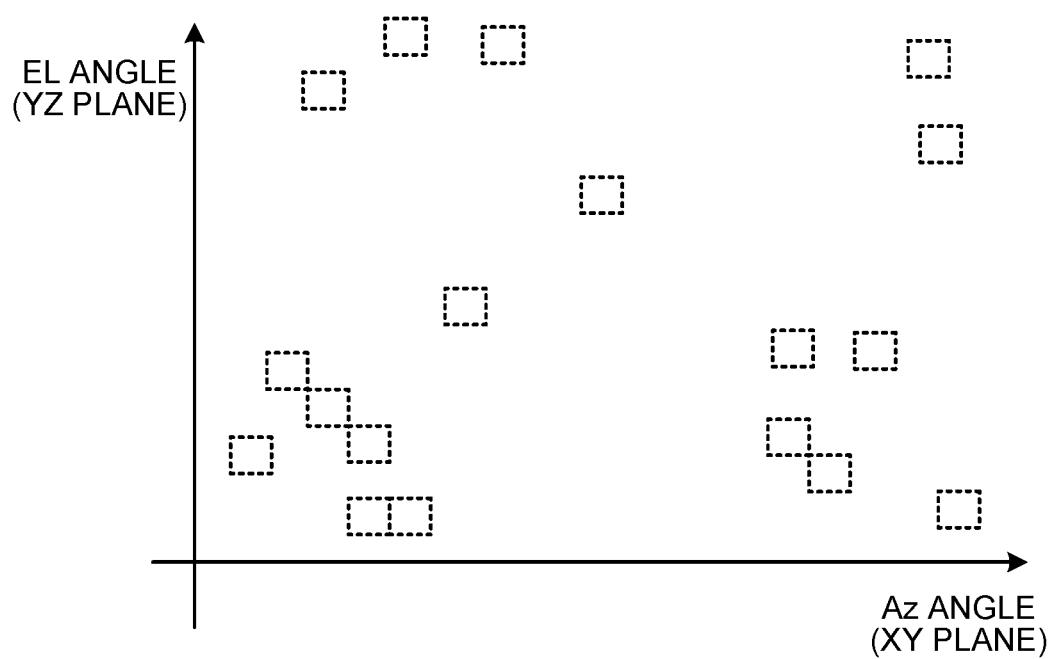
FIG. 14 is a graph indicating an example of extraction from the intensity difference table.
Figure 15:
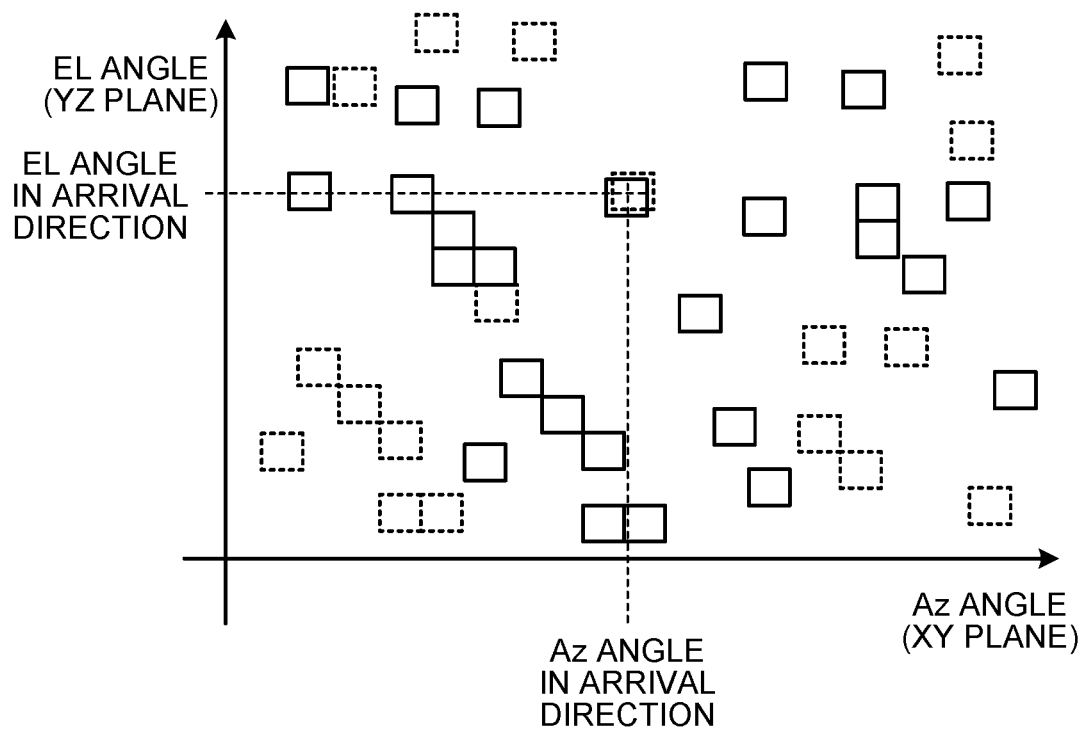
FIG. 15 is a graph on which the candidates for the received-wave arrival direction are superimposed.

Next, referring to FIGS. 12 to 15, the following describes the third embodiment. In order to avoid duplicate descriptions, part of the third embodiment that is different from the first and second embodiments is described, and part that has the same configuration as the first and second embodiments is described with the same symbol. FIG. 12 is an explanatory diagram relating to the direction detection device and the direction detection method according to the third embodiment. FIG. 13 is a graph indicating an example of the phase difference table. FIG. 14 is a graph indicating an example of the intensity difference table. FIG. 15 is a graph on which received-wave arrival directions are superimposed.

In the direction detection method of the first and second embodiments, the received-wave arrival direction corresponding to the phase difference is calculated by operation using the predetermined calculation expression. In the third embodiment, the received-wave arrival direction corresponding to the phase difference is calculated using the phase difference table T2.

Direction Detection Device

The direction detection device 40 of the third embodiment includes the antennas 5 and the radome 6. Since the antennas 5 are the same as those of the first and second embodiments, the description is omitted. The radome 6 functions as the phase difference imparting unit that imparts phase differences different depending on the received-wave arrival direction. The radome 6 imparts phase differences different depending on the received-wave arrival direction by having different shapes, different laminate configurations, or both different shapes and laminate configurations.

As illustrated in FIG. 12, the direction detection device 40 includes the detector 10, the storage unit 11, the extractor 13, and the comparator 14.

The detector 10 is connected to the two antennas 5 and has a detection unit 10a that detects the phase difference and a detection unit 10b that detects the intensity difference. The detection unit 10a detects the phase difference of the received wave to be received by the two antennas 5, and if necessary, the frequency and polarization. In other words, in the third embodiment, the detection unit 10a detects the phase difference between the "Antenna 1" and the "Antenna 2", as the phase difference between the two antennas 5. The detection unit 10b is the same as that in the first and second embodiments.

The storage unit 11 stores therein the phase difference table T2 instead of the distance d between the two antennas 5. The phase difference table T2 is substantially the same as the intensity difference table T1 illustrated in FIG. 5. In other words, the phase difference table T2 has data that associate the phase difference between the two antennas 5 with the received-wave arrival direction. The phase difference table T2 may be prepared for each frequency or each polarization in the same way as in the intensity difference table T1. The method of acquiring the phase difference table T2 is executed using the acquisition device 21 described above. The phase difference table T2 can be acquired by acquiring the phase difference instead of the intensity difference obtained in the method of acquiring the intensity difference table T1. In the method of acquiring the phase difference table T2, the phase difference table T2 may be acquired for each frequency and each polarization of the received wave, and the phase difference table T2 may be acquired only for each frequency or each polarization.

A plurality of the phase difference tables T2 prepared for each frequency or each polarization of the received waves may undergo an interpolation process in which the intensity difference between the frequencies or the polarizations is interpolated. Furthermore, each cell in the phase difference table T2 is associated with an arrival direction consisting of the AZ and EL angles, but an interpolation process may be performed in which the AZ and EL angles between cells are interpolated.

The extractor 13 includes an extraction unit 13a using the phase difference table T2 and an extraction unit 13b using the intensity difference table T1. The extraction unit 13b is the same as the extractor 13 of the first and second embodiments. The extraction unit 13a extracts the received-wave arrival direction corresponding to the phase difference, from the phase difference table T2 of the "Antenna 1" and the "Antenna 2", using the frequency, the polarization, and the phase difference of the received wave detected in the detection unit 10a of the detector 10. Specifically, in the third embodiment, the extraction unit 13a acquires the phase difference table T2 corresponding to the frequency, using the frequency of the received wave detected in the detection unit 10a. Thereafter, the extractor 13 extracts the cells in the phase difference table T2 corresponding to the phase difference detected in the detection unit 10b.

The comparator 14 acquires the received-wave arrival direction in which a plurality of candidates for the arrival direction extracted by the extraction unit 13a of the extractor 13 and a plurality of candidates for the arrival direction extracted by the extraction unit 13b of the extractor 13 match, as a detection result. Now, referring to FIGS. 13 to 15, the following specifically describes processing by the comparator 14. FIG. 13 is a diagram where cells with the same value of the phase difference are extracted in the phase difference table T2. FIG. 13 is a diagram where cells with a predetermined phase difference Δθ between the "Antenna 1" and the "Antenna 2" are extracted. FIG. 14 is a diagram where cells with the same value of the intensity difference are extracted in the intensity difference table T1 as illustrated in FIG. 5. FIG. 14 is a diagram where cells with a predetermined intensity difference ΔE between the "Antenna 1" and the "Antenna 2" are extracted.

The comparator 14 acquires candidate cells for the arrival direction based on the phase difference Δθ between the "Antenna 1" and the "Antenna 2" as illustrated in FIG. 13. The comparator 14 also acquires candidate cells for the arrival direction based on the intensity difference ΔE between the "Antenna 1" and the "Antenna 2", as illustrated in FIG. 14. Then, the comparator 14 superimposes, as illustrated in FIG. 15, cells that fall within the arrival direction based on the phase difference cells Δθ between the "Antenna 1" and the "Antenna 2" on cells that fall within the arrival direction based on the intensity difference ΔE between the "Antenna 1" and the "Antenna 2", so as to acquire cells that match. The comparator 14 then acquires the AZ and EL angles corresponding to the acquired cells as detection results. In other words, the azimuth indicated by the combination of the AZ and EL angles indicated by the cells that match one another is an azimuth that causes the "Antenna 1" and the "Antenna 2" to generate the phase difference Δθ and also causes the "Antenna 1" and the "Antenna 2" to generate the intensity difference ΔE, and matches an observation result, so that it is possible to estimate the azimuth as the received-wave arrival direction.

Direction Detection Method

Next, referring to FIG. 12, the following describes the direction detection method for detecting the received-wave arrival direction by the direction detection device 40.

The direction detection method first executes step S11 in which the two antennas 5 receive received waves. Thereafter, in the direction detection method, step S12 is executed in which the detector 10 detects the phase difference and the intensity difference between the two antennas 5 using the received waves received by the two antennas 5. At step S12, the detection unit 10a detects the phase difference between the two antennas 5 and, if necessary, the frequency or the polarization, and the detection unit 10b detects the intensity difference between the two antennas 5 and, if necessary, the frequency or the polarization. Subsequently, in the direction detection method, step S13 is executed in which the extractor 13 acquires, using the detected frequencies or the polarizations, the intensity difference table T1 and the phase difference table T2 corresponding to the frequencies or polarizations, from the storage unit 11. Then, in the direction detection method, step S14 is executed in which the extraction unit 13a of the extractor 13 extracts, from the acquired phase difference table T2, cells corresponding to the received-wave arrival direction corresponding to the phase difference detected by the detector 10, that is, corresponding to the AZ angle and the EL angle. Then, in the direction detection method, step S15 is executed in which the extraction unit 13b of the extractor 13 extracts, from the acquired intensity difference table T1, cells corresponding to the received-wave arrival direction corresponding to the intensity difference detected by the detector 10, that is, corresponding to the AZ angle and the EL angle. In the direction detection method, after the execution of step S15, step S16 is executed in which the comparator 14 compares the received-wave arrival direction corresponding to the phase difference and the acquired cells of the AZ and EL angles, and acquires the AZ and EL angles of the cells that match as the detection results. In the direction detection method of the third embodiment, the cells are acquired from the intensity difference table T1 and the phase difference table T2 on the basis of the frequencies or the polarizations, but the cells may be acquired from the intensity difference table T1 and the phase difference table T2 on the basis of the frequencies and the polarizations.

Fourth Embodiment

Figure 16:
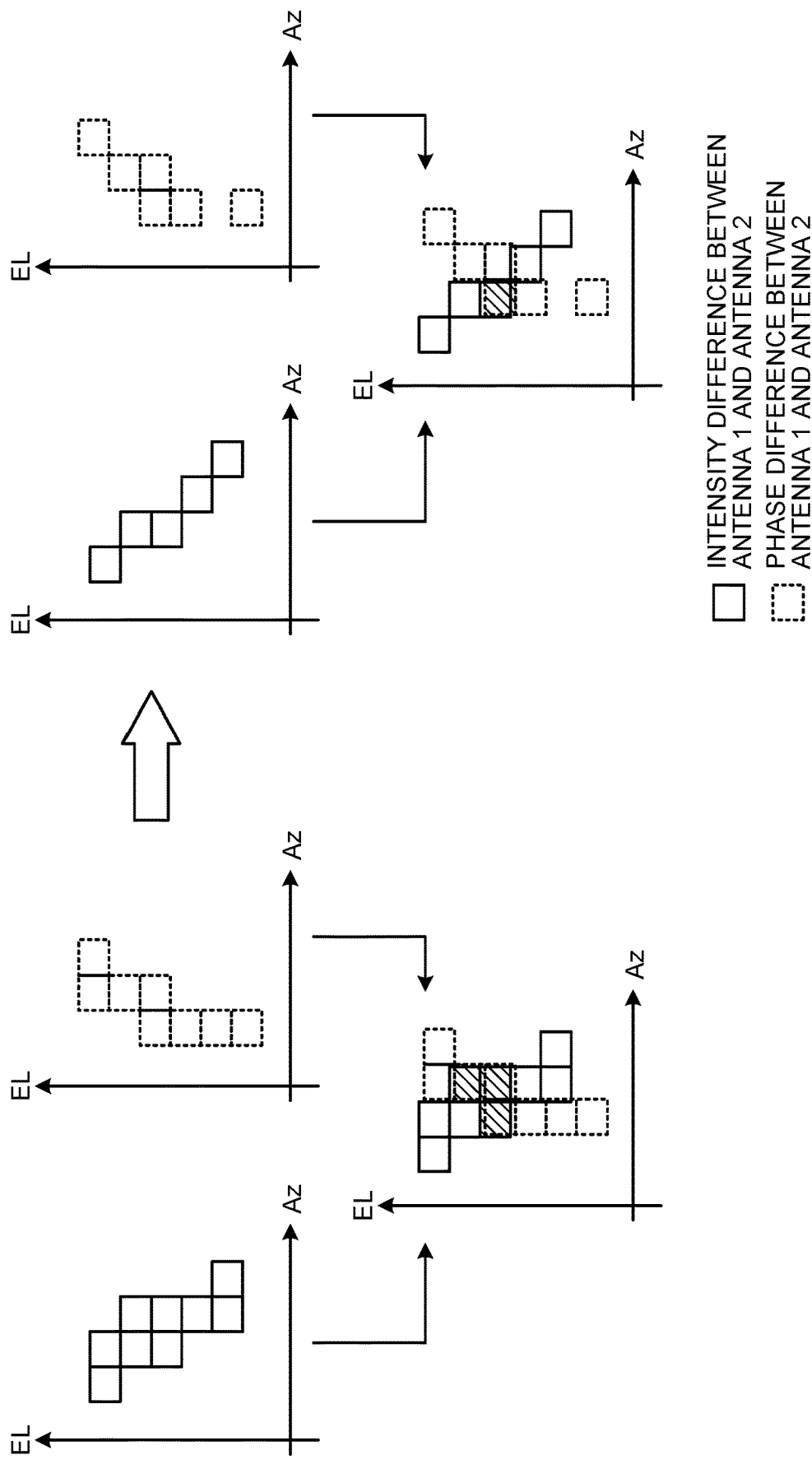
FIG. 16 is an explanatory diagram of an example relating to a direction detection device and a direction detection method according to a fourth embodiment.
Figure 17:
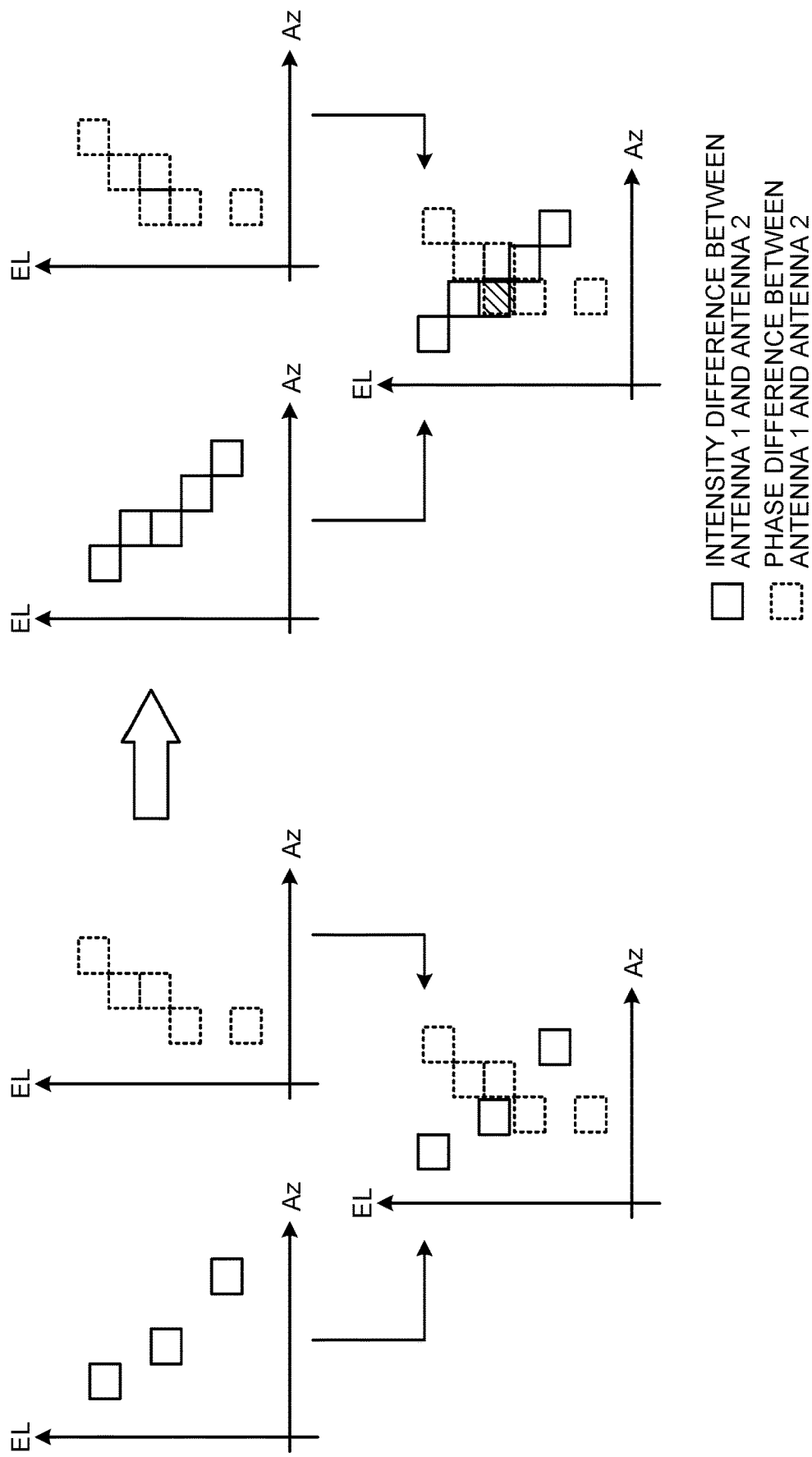
FIG. 17 is an explanatory diagram of an example relating to the direction detection device and the direction detection method according to the fourth embodiment.

Next, referring to FIGS. 16 and 17, the following describes the fourth embodiment. In order to avoid duplicate descriptions, part of the fourth embodiment that differ from the first to third embodiments is described, and part that has the same configuration as the first to third embodiments is described with the same symbol. FIGS. 16 and 17 are explanatory diagrams of an example relating to the direction detection device and the direction detection method according to the fourth embodiment.

In the direction detection method of the third embodiment, the extraction unit 13a of the extractor 13 extracts the cells corresponding to the phase difference detected by the detection unit 10a of the detector 10, and the extraction unit 13b of the extractor 13 extracts the cells corresponding to the intensity difference detected by the detection unit 10b of the detector 10. In this case, there may be more than one cell that match in the comparator 14, as illustrated on the left side of FIG. 16. In the comparator 14, there may be no cell that matches as illustrated on the left side of FIG. 17.

Thus, in the direction detection method of the fourth embodiment, the extraction unit 13a of the extractor 13 extracts the received-wave arrival direction corresponding to the intensity difference width obtained by imparting a second adjustment width (α, β) to the phase difference Δθ detected by the detection unit 10a. Specifically, the extraction unit 13a acquires, when acquiring the phase difference 60 from the detection unit 10a, generates "Δθ−α<Δθ<Δθ+β" as the phase difference width and acquires a cell corresponding to the generated phase difference width. Here, the extraction unit 13a reduces the number of cells to be acquired by decreasing the second adjustment width (α, β), or increases the number of cells to be acquired by increasing the second adjustment width (α, β).

Thus, in the direction detection method, the extraction unit 13b of the extractor 13 extracts the received-wave arrival direction corresponding to the intensity difference width obtained by imparting the adjustment width (α, β) to the intensity difference 6E detected by the detection unit 10b. Specifically, the extraction unit 13b acquires, when acquiring the intensity difference ΔE from the detection unit 10b, generates "ΔE−α<ΔE<ΔE+β" as the intensity difference width and acquires a cell corresponding to the generated intensity difference width. Here, the extraction unit 13b reduces the number of cells to be acquired by decreasing the first adjustment width (α, β), or increases the number of cells to be acquired by increasing the first adjustment width (α, β).

Specifically, as illustrated on the left side of FIG. 16, when the comparator 14 compares the cells that fall within the phase difference width between the "Antenna 1" and the "Antenna 2" and the cells that fall within the intensity difference width between the "Antenna 1" and the "Antenna 2", resulting in more than one cell that match, the extractor 13 narrows at least one of the phase difference width and the intensity difference width. This narrowing reduces the number of the cells that fall within the phase difference width between the "Antenna 1" and the "Antenna 2", and the number of the cells that fall within the intensity difference width between the "Antenna 1" and the "Antenna 2". Then, the comparator 14 again compares the cells that fall within the intensity difference width between the "Antenna 1" and the "Antenna 2", and the cells that fall within the intensity difference width between the "Antenna 1" and the "Antenna 2", so as to be able to find cells that match, as illustrated on the right side of FIG. 16.

As illustrated on the left side of FIG. 17, when the comparator 14 compares the cells that fall within the phase difference width between the "Antenna 1" and the "Antenna 2" and the cells that fall within the intensity difference width between the "Antenna 1" and the "Antenna 2", resulting in no cells that match, that is, the cells are inconsistent, the extractor 13 widens the phase difference width and the intensity difference width. This widening increases the number of cells that fall within the phase difference width between the "Antenna 1" and the "Antenna 2", and the number of cells that fall within the intensity difference width between the "Antenna 1" and the "Antenna 2". Then, the comparator 14 again compares the cells that fall within the phase difference width between the "Antenna 1" and the "Antenna 2" and the cells that fall within the intensity difference width between the "Antenna 1" and the "Antenna 2", so as to be able to find cells that match, as illustrated on the right side of FIG. 17.

Fifth Embodiment

Figure 18:
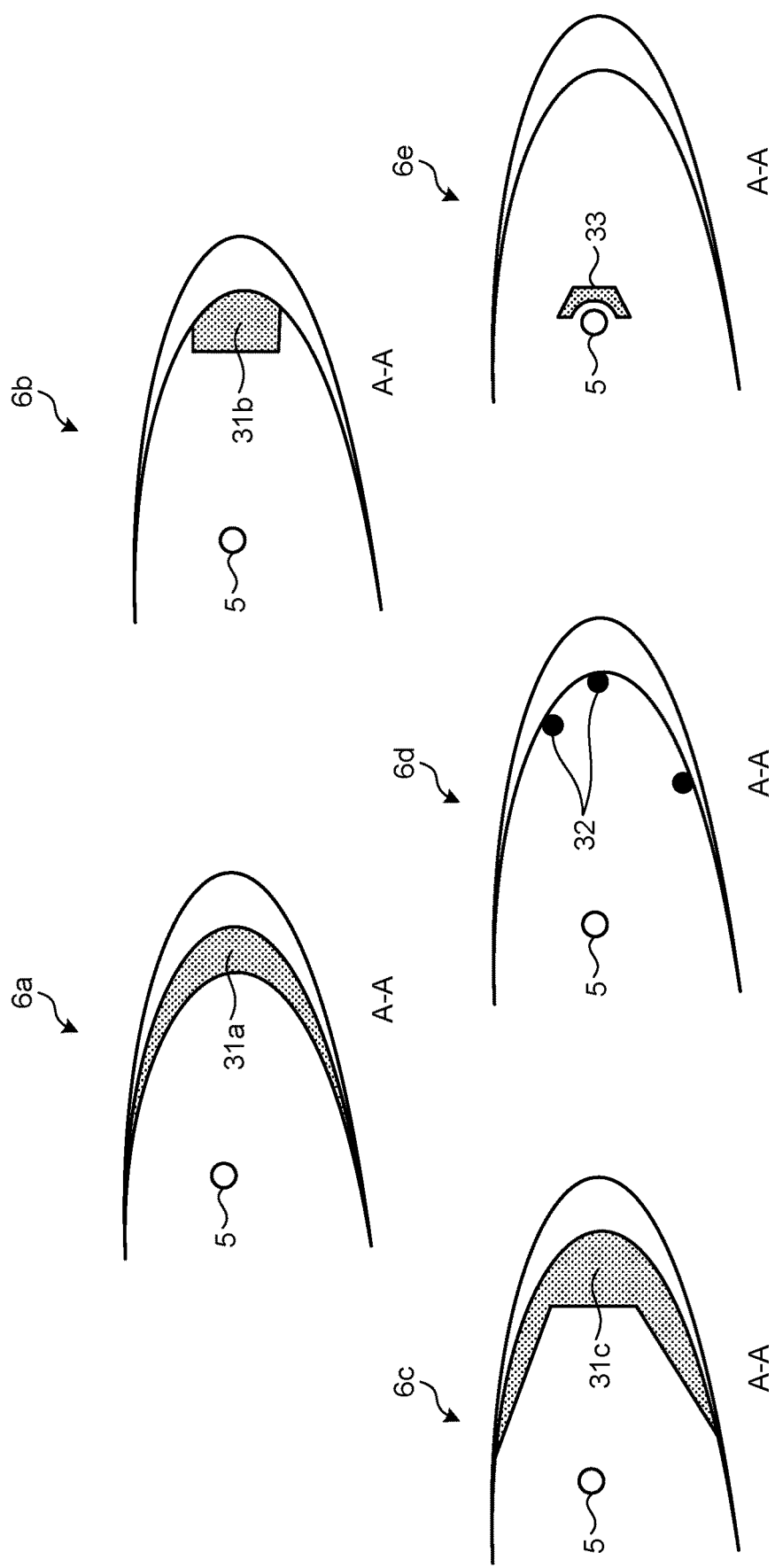
FIG. 18 is a cross-sectional view illustrating an example of a shape of a radome of a direction detection device according to a fifth embodiment.

Next, referring to FIG. 18, the following describes the fifth embodiment. In order to avoid duplicate descriptions, part of the fifth embodiment that is different from the first to fourth embodiments is described, and part that has the same configuration as the first to fourth embodiments is described with the same symbol. FIG. 18 is a cross-sectional view illustrating an example of a shape of the radome of the direction detection device according to the fifth embodiment.

In the direction detection method of the first to fourth embodiments, the extractor 13 extracts the cells corresponding to the intensity difference detected by the detector 10, from the intensity difference table T1. In this case, there may be more than one cell that match, and the comparator 14 may fail to narrow down cells that match even by adjusting the intensity difference width. This is because the radome 6 has part to which intensity differences different depending on the received-wave arrival direction is not imparted, or part in which the imparting is insufficient.

For this reason, the fifth embodiment has, as illustrated in FIG. 18, a configuration in which a material for changing electrical characteristics is added to the radome 6 of the direction detection device 1. For example, a dielectric, metal, or other good conductor can be used as a material for changing the electrical characteristics. The following describes a configuration in which a dielectric 31 is added. In the dielectric 31, it is sufficient that intensity differences different depending on the received-wave arrival direction are imparted, for example, dielectrics 31a to 31c, 32, and 33 in FIG. 18 may be arranged. In the radome 6a of FIG. 18, the dielectric 31a is disposed following the inside of the radome 6a, and the dielectric 31a has an inner surface that is a curved surface. In the radome 6b of FIG. 18, the dielectric 31b has a block shape that protrudes from the inside of the radome 6a. In the radome 6c of FIG. 18, the dielectric 31c is disposed following the inside of the radome 6c, the dielectric 31c has an inner surface the part of which facing the antenna 5 is a flat surface, and the flat surface has a surface connected to both sides in the EL direction, the surface also being a flat surface. In the radome 6d in FIG. 18, a separate dielectric 32 is attached to the inside of the radome 6a. In the radome 6e of FIG. 18, a dielectric 33 having a cap shape is attached to cover the antenna 5.

Although not illustrated, a material for changing the electrical characteristics, such as a dielectric 31, may be arranged on the outside of the radome 6. For example, when the direction detection device 1 is mounted on an aircraft, an airframe on the outside of the radome 6 may be used as a material for changing the electrical characteristics. In other words, the airframe on the outside of the radome 6 may function as an intensity difference imparting unit that imparts intensity differences different depending on the received-wave arrival direction.

Furthermore, the fifth embodiment may be applied in the case of imparting the phase difference described in the third embodiment. In other words, by adding the material for changing the electrical characteristics to the radome 6, phase differences different depending on the received-wave arrival direction may be imparted.

Sixth Embodiment

Figure 19:
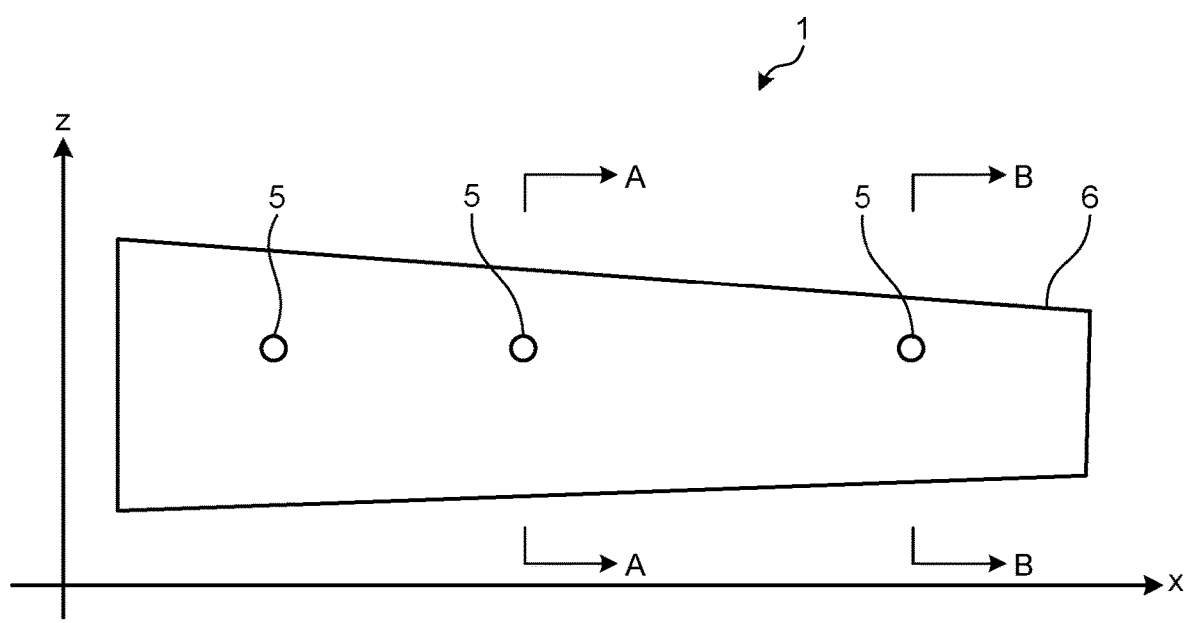
FIG. 19 is a schematic diagram illustrating an example of the arrangement of a plurality of antennas of a direction detection device according to a sixth embodiment.

Next, referring to FIG. 19, the following describes the sixth embodiment. In order to avoid duplicate descriptions, part of the sixth embodiment that is different from the first to fifth embodiments is described, and part that has the same configuration as the first to fifth embodiments is described with the same symbol. FIG. 19 is a schematic diagram illustrating an example of the arrangement of the antennas of the direction detection device according to the sixth embodiment.

In the first to fifth embodiments, the two antennas 5 are arranged side by side, but the three or more antennas may be arranged in the AZ direction, as illustrated in FIG. 19. When the three or more antennas 5 are used, the number of combinations of the two antennas 5 can be increased, thus the number of candidates for the received-wave arrival direction corresponding to the intensity difference can be increased, so that the accuracy of narrowing candidates can be increased. When the three or more antennas 5 are used, candidates for the received-wave arrival direction corresponding to the intensity difference in the third and the fourth embodiments can be increased by increasing the number of combinations of the two antennas 5.

In the case where the three or more antennas 5 are used in the sixth embodiment, when the received-wave arrival direction corresponding to the phase difference is calculated using the predetermined calculation expression, the antennas are lined up in a row in the AZ direction and arranged so that the distances between the antennas are unequal. On the other hand, in the case where the three or more antennas 5 are used in the sixth embodiment, when the received-wave arrival direction corresponding to the phase difference is calculated using the phase difference table T2, there is no restriction on the arrangement of the antennas 5.

The first to fifth embodiments have a configuration in which the received-wave arrival direction is detected using the intensity difference table T1, in which the intensity difference in each cell is acquired, while the AZ and EL angles are changed, but are not particularly limited to this configuration. For example, the first to fifth embodiments may have a configuration in which, while the radome 6 is being deformed under load, the intensity difference in each cell is acquired to generate an intensity difference table T1, and the received-wave arrival direction is detected using the generated intensity difference table T1, considering the deformation of the radome 6 under load.

In the first to fifth embodiments, the radome 6 of the direction detection devices 1, 40 functions as the intensity difference imparting unit, but the antennas 5 may have elements the gains of which are spatially non-uniform, so that the antennas 5 themselves may function as the intensity difference imparting unit. In other words, the elements of the antennas 5 have different gains, respectively, so that it is possible to acquire intensity differences different depending on the received-wave arrival direction.

As in the foregoing, the direction detection devices 1, 40, the method of acquiring the intensity difference table T1, the direction detection method, and the direction detection program described in the embodiments are understood, for example, as follows.

The direction detection device 1 or 40 according to the first aspect includes: a plurality of antennas 5 that receive the received wave in the direction detection devices 1, 40; an intensity difference imparting unit (radome 6, dielectric 31, good conductor, antenna elements having gains that are spatially non-uniform) that imparts intensity differences different depending on the received-wave arrival direction to intensities of the received wave to be received at the antennas 5; a storage unit 11 that stores an intensity difference table T1 in which the intensity difference between two of the antennas 5 is associated with the received-wave arrival direction, for each combination of any two of the antennas 5; a detector 10 that detects an intensity difference between the two antennas 5 and a phase difference between the two antennas 5, of the received wave to be received at the antennas 5; an extractor 13 that extracts, from the intensity difference table stored in the storage unit 11, a received-wave arrival direction corresponding to the intensity difference detected by the detector 10, for each combination of any two of the antennas 5; a calculation unit (operation unit 12) that a received-wave arrival direction corresponding to the phase difference detected by the detector 10; and a comparator 14 that compares the received-wave arrival direction extracted by the extractor 13 with the received-wave arrival direction calculated by the calculation unit to acquire a matched received-wave arrival direction as a detection result.

With this configuration, even when the antennas 5 are arranged because of physical restrictions in the internal space of the radome 6, by using the phase difference and the intensity difference that are different physical quantities, it is possible to eliminate ambiguity and suitably acquire a three-dimensional arrival direction of the received wave. In this case, it is sufficient that at least two antennas 5 are used, so that the device configuration can be simplified.

In the second aspect, the intensity difference table T1 is stored for each frequency or for each polarization of the received wave, the detector 10 detects the frequency or the polarization of the received wave, and the extractor 13 acquires the intensity difference table T1 corresponding to the frequency or the polarization by using the frequency or the polarization detected by the detector 10, and extracts, from the acquired intensity difference table T1, a received-wave arrival direction corresponding to the intensity difference detected by the detector 10.

With this configuration, since the intensity difference table T1 can be acquired for each frequency or each polarization, the appropriate intensity difference corresponding to the frequency and the polarization can be acquired, and the received-wave arrival direction with good accuracy corresponding to the intensity difference can be extracted.

In the third aspect, the intensity difference imparting unit includes a radome 6 that houses the antennas 5, and the radome 6 has a non-uniform shape or a non-uniform structure in three-dimensional space.

With this configuration, the radome 6 has a non-uniform shape or a non-uniform structure in a three-dimensional space, so that it is possible to impart intensity differences different depending on the received-wave arrival direction.

In the fourth aspect, the intensity difference imparting unit is disposed in a radome 6 that houses the antennas 5, and has a material that changes an electrical characteristic of the received wave (dielectric 31, good conductor).

With this configuration, a material that changes the electrical characteristics is disposed in the radome 6, so that it is possible to easily impart intensity differences different depending on the received-wave arrival direction.

In the fifth aspect, the intensity difference imparting unit is implemented as elements of the antennas 5 having gains which are spatially non-uniform.

With this configuration, the antennas 5 have elements the gains of which are spatially non-uniform, so that it is possible to allow the antennas 5 themselves to function as the intensity difference imparting unit. In other words, the elements of the antennas 5 have different gains, respectively, so that it is possible to easily acquire intensity differences different depending on the received-wave arrival direction.

In the sixth aspect, the extractor 13 extracts a plurality of received-wave arrival directions corresponding to an intensity difference width obtained by imparting a first adjustment width to the intensity difference detected by the detector 10, and the comparator 14, when there is no match between candidates for the received-wave arrival direction corresponding to the intensity difference width and candidates for the received-wave arrival direction corresponding to the phase difference, widens the first adjustment width, and when there are a plurality of matches between candidates for the received-wave arrival direction corresponding to the intensity difference width and candidates for the received-wave arrival direction corresponding to the phase difference, narrows the first adjustment width.

With this configuration, the first adjustment width is adjusted, so that it is possible to appropriately find a received-wave arrival direction that matches.

In the seventh aspect, the received-wave arrival direction is defined by an AZ angle, which is an angle in an azimuthal direction, and an EL angle, which is an angle in an elevation direction orthogonal to the azimuthal direction, and the intensity difference table T1 has a plurality of cells each identified by an AZ angle and an EL angle, and in the intensity difference table T1, an intensity difference is set in each cell, and intensity differences are interpolated between the cells.

With this configuration, the intensity difference between cells can be interpolated appropriately, so that it is possible to accurately acquire the intensity difference and appropriately acquire the received-wave arrival direction corresponding to the intensity difference.

In the eighth aspect, when the intensity difference table T1 is prepared for each frequency or each polarization of the received wave, in the intensity difference table T1, intensity differences are interpolated between the frequencies or between the polarizations.

With this configuration, the intensity difference between frequencies and between polarizations can be appropriately interpolated, so that it is possible to accurately acquire the intensity difference between the frequencies and the polarizations, and appropriately acquire the received-wave arrival direction corresponding to the intensity difference.

In the ninth aspect, the calculation unit is an operation unit 12 that calculates the received-wave arrival direction from a predetermined calculation expression based on the phase difference, the frequency of the received wave, and a distance between the two antennas 5.

With this configuration, it is possible to easily calculate the received-wave arrival direction by operation using the predetermined calculation expression.

In the tenth aspect, the storage unit further stores, for each combination of any two of the antennas, a phase difference table T2 in which a phase difference between the two antennas 5 is associated with the received-wave arrival direction, and the calculation unit is the extractor 13 that extracts, from the phase difference table T2 stored in the storage unit 11, a received-wave arrival direction corresponding to the phase difference detected by the detector 10, for each combination of any two of the antennas 5.

With this configuration, the phase difference table T2 is used, so that it is possible to easily extract a candidate of a received-wave arrival direction.

In the eleventh aspect, the phase difference table T2 is stored for each frequency or for each polarization of the received wave, the detector 10 detects the frequency or the polarization of the received wave, and the extractor 13 acquires the phase difference table T2 corresponding to the frequency or the polarization by using the frequency or the polarization detected by the detector 10, and extracts, from the acquired phase difference table T2, a received-wave arrival direction corresponding to the phase difference detected by the detector 10.

With this configuration, since the phase difference table T2 can be acquired for each frequency or each polarization, the appropriate phase difference corresponding to the frequency and the polarization can be acquired, and the received-wave arrival direction with good accuracy corresponding to the phase difference can be extracted.

In the twelfth aspect, the extractor 13 extracts a plurality of received-wave arrival directions corresponding to a phase difference width obtained by imparting a second adjustment width to the phase difference detected by the detector 10, and the comparator 14, when there is no match between candidates for the received-wave arrival direction corresponding to the phase difference width and candidates for the received-wave arrival direction corresponding to the intensity difference, widens the second adjustment width, whereas when there are a plurality of matches between candidates for the received-wave arrival direction corresponding to the phase difference width and candidates for the received-wave arrival direction corresponding to the intensity difference, narrows the second adjustment width.

With this configuration, the second adjustment width is adjusted, so that it is possible to appropriately find a received-wave arrival direction that matches.

In the thirteenth aspect, the received-wave arrival direction is defined by an AZ angle, which is an angle in an azimuthal direction, and an EL angle, which is an angle in an elevation direction orthogonal to the azimuthal direction, and the phase difference table T2 has a plurality of cells each identified by an AZ angle and an EL angle, and in the phase difference table T2, a phase difference is set in each cell, and phase differences are interpolated between the cells.

With this configuration, the phase difference between cells can be interpolated appropriately, so that it is possible to accurately acquire the phase difference and appropriately acquire the received-wave arrival direction corresponding to the phase difference.

In the fourteenth aspect, when the phase difference table T2 is prepared for each frequency or each polarization of the received wave, in the phase difference table T2, phase differences are interpolated between the frequencies or between the polarizations.

With this configuration, the phase difference between frequencies and between polarizations can be appropriately interpolated, so that it is possible to accurately acquire the phase difference between the frequencies and the polarizations, and appropriately acquire the received-wave arrival direction corresponding to the phase difference.

The method of acquiring an intensity difference table T1 according to the fifteenth aspect is a method of acquiring the intensity difference table T1 used in the direction detection device 1 or 40 described above, the method including: setting up a radio wave source (transmitter 22) for generating the received wave so that the received wave is in a predetermined arrival direction with respect to the plurality of antennas 5; causing the radio wave source to generate the received wave; receiving the received wave by the antennas 5; and acquiring the intensity difference table T1 in which an intensity difference of the received wave between two of the antennas 5 is associated with a received-wave arrival direction.

With this configuration, it is possible to acquire the intensity difference table T1 that appropriately associate the intensity difference with the received-wave arrival direction.

The direction detection method according to the sixteenth aspect is a direction detection method of detecting a received-wave arrival direction of a received wave by the direction detection device 1 or 40 described above, the method including: step S1/S11 of receiving the received wave by the plurality of antennas 5; step S2/S12 of detecting, by the detector 10, an intensity difference between the two antennas 5 and a phase difference between the two antennas, of the received wave to be received by the antennas 5; step S5/S15 of extracting, by the extractor 13, from the intensity difference table T1 stored in the storage unit 11, a received-wave arrival direction corresponding to the intensity difference detected by the detector 10, for each combination of any two of the antennas 5; step S3/S13 of calculating, by the calculation unit, a received-wave arrival direction corresponding to the phase difference detected by the detector 10; and step S6/S16 of comparing, by the comparator 14, the received-wave arrival direction extracted by the extractor 13 with the received-wave arrival direction calculated by the calculation unit to acquire a matched received-wave arrival direction as a detection result.

With this configuration, even when a plurality of the antennas 5 are arranged due to physical restrictions in the internal space of the radome 6, by using the phase difference and the intensity difference that are difference physical quantities, it is possible to eliminate ambiguity and suitably acquire a three-dimensional arrival direction of the received wave. In this case, it is sufficient that at least two antennas 5 are used, so that the device configuration can be simplified.

The direction detection device 1 or 40 may include a computer including at least a processor and a memory; the direction detection program may be stored on a computer-readable storage medium, such as a magnetic disk, an optical disc, or a semiconductor memory, to be executed by the computer. A non-transitory computer-readable according to the seventeenth aspect stores the direction detection program for detecting a received-wave arrival direction of a received wave, the direction detection program, when executed by a computer of the direction detection device 1 or 40 described above, causing the direction detection device to: receive the received wave by the plurality of antennas 5; detect an intensity difference between the two antennas 5 and a phase difference between the two antennas, of the received wave to be received by the antennas 5; extract, from the intensity difference table T1 stored in the storage unit 11, a received-wave arrival direction corresponding to the detected intensity difference, for each combination of any two of the antennas 5; calculate a received-wave arrival direction corresponding to the phase difference detected by the detector 10; and compare the extracted received-wave arrival direction with the calculated received-wave arrival direction to acquire a matched received-wave arrival direction as a detection result.

With this configuration, even when a plurality of the antennas 5 are arranged due to physical restrictions in the internal space of the radome 6, by using the phase difference and the intensity difference that are difference physical quantities, it is possible to eliminate ambiguity and suitably acquire a three-dimensional arrival direction of the received wave. In this case, it is sufficient that at least two antennas 5 are used, so that the device configuration can be simplified.

REFERENCE SIGNS LIST

1, 40 Direction detection device
5 Antenna
6 Radome
10 Detector
11 Storage unit
12 Operation unit
13 Extractor
14 Comparator
21 Acquisition device
22 Transmitter
23 Receiver
24 Operating unit
25 Measuring unit
31*a* to 31*c*, 32, 33 Dielectric
T1 Intensity difference table
T2 Phase difference table

The invention claimed is:

1. A direction detection device for detecting a received-wave arrival direction of a received wave, the direction detection device comprising:
   a plurality of antennas that receive the received wave;
   an intensity difference imparting unit that imparts intensity differences different depending on the received-wave arrival direction to intensities of the received wave to be received at the antennas;
   a storage unit that stores an intensity difference table in which the intensity difference between two of the antennas is associated with the received-wave arrival direction, for each combination of any two of the antennas;
   a detector that detects an intensity difference between the two antennas and a phase difference between the two antennas, of the received wave to be received at the antennas;
   an extractor that extracts, from the intensity difference table stored in the storage unit, a received-wave arrival direction corresponding to the intensity difference detected by the detector, for each combination of any two of the antennas;
   a calculation unit that calculates a received-wave arrival direction corresponding to the phase difference detected by the detector; and
   a comparator that compares the received-wave arrival direction extracted by the extractor with the received-wave arrival direction calculated by the calculation unit to acquire a matched received-wave arrival direction as a detection result.

2. The direction detection device according to claim 1, wherein
   the intensity difference table is stored for each frequency or for each polarization of the received wave,
   the detector detects the frequency or the polarization of the received wave, and
   the extractor acquires the intensity difference table corresponding to the frequency or the polarization by using the frequency or the polarization detected by the detector, and extracts, from the acquired intensity difference table, a received-wave arrival direction corresponding to the intensity difference detected by the detector.

3. The direction detection device according to claim 1, wherein
   the intensity difference imparting unit includes a radome that houses the antennas, and
   the radome has a non-uniform shape or a non-uniform structure in three-dimensional space.

4. The direction detection device according to claim 1, wherein the intensity difference imparting unit is disposed in a radome that houses the antennas, and has a material that changes an electrical characteristic of the received wave.

5. The direction detection device according to claim 1, wherein the intensity difference imparting unit is implemented as elements of the antennas having gains which are spatially non-uniform.

6. The direction detection device according to claim 1, wherein
   the extractor extracts a plurality of received-wave arrival directions corresponding to an intensity difference width obtained by imparting a first adjustment width to the intensity difference detected by the detector, and
   the comparator, when there is no match between candidates for the received-wave arrival direction corresponding to the intensity difference width and candidates for the received-wave arrival direction corresponding to the phase difference, widens the first adjustment width, and when there are a plurality of matches between candidates for the received-wave arrival direction corresponding to the intensity difference width and candidates for the received-wave arrival direction corresponding to the phase difference, narrows the first adjustment width.

7. The direction detection device according to claim 1, wherein
   the received-wave arrival direction is defined by an AZ angle, which is an angle in an azimuthal direction, and an EL angle, which is an angle in an elevation direction orthogonal to the azimuthal direction, and the intensity difference table has a plurality of cells each identified by an AZ angle and an EL angle, and in the intensity difference table, an intensity difference is set in each cell, and intensity differences are interpolated between the cells.

8. The direction detection device according to claim 1, wherein
when the intensity difference table is prepared for each frequency or each polarization of the received wave,
in the intensity difference table, intensity differences are interpolated between the frequencies or between the polarizations.

9. The direction detection device according to claim 1, wherein the calculation unit is an operation unit that calculates the received-wave arrival direction from a predetermined calculation expression based on the phase difference, the frequency of the received wave, and a distance between the two antennas.

10. The direction detection device according to claim 1, wherein
the storage unit further stores, for each combination of any two of the antennas, a phase difference table in which a phase difference between the two antennas is associated with the received-wave arrival direction, and
the calculation unit extracts is the extractor that extracts, from the phase difference table stored in the storage unit, a received-wave arrival direction corresponding to the phase difference detected by the detector, for each combination of any two of the antennas.

11. The direction detection device according to claim 10, wherein
the phase difference table is stored for each frequency or for each polarization of the received wave,
the detector detects the frequency or the polarization of the received wave, and
the extractor acquires the phase difference table corresponding to the frequency or the polarization by using the frequency or the polarization detected by the detector, and extracts, from the acquired phase difference table, a received-wave arrival direction corresponding to the phase difference detected by the detector.

12. The direction detection device according to claim 10, wherein
the extractor extracts a plurality of received-wave arrival directions corresponding to a phase difference width obtained by imparting a second adjustment width to the phase difference detected by the detector, and
the comparator, when there is no match between candidates for the received-wave arrival direction corresponding to the phase difference width and candidates for the received-wave arrival direction corresponding to the intensity difference, widens the second adjustment width, whereas when there are a plurality of matches between candidates for the received-wave arrival direction corresponding to the phase difference width and candidates for the received-wave arrival direction corresponding to the intensity difference, narrows the second adjustment width.

13. The direction detection device according to claim 10, wherein
the received-wave arrival direction is defined by an AZ angle, which is an angle in an azimuthal direction, and an EL angle, which is an angle in an elevation direction orthogonal to the azimuthal direction, and
the phase difference table has a plurality of cells each identified by an AZ angle and an EL angle, and in the phase difference table, a phase difference is set in each cell, and phase differences are interpolated between the cells.

14. The direction detection device according to claim 10, wherein
when the phase difference table is prepared for each frequency or each polarization of the received wave,
in the phase difference table, phase differences are interpolated between the frequencies or between the polarizations.

15. A method of acquiring the intensity difference table used in the direction detection device according to claim 1, the method comprising:
setting up a radio wave source for generating the received wave so that the received wave is in a predetermined arrival direction with respect to the plurality of antennas;
causing the radio wave source to generate the received wave;
receiving the received wave by the antennas; and
acquiring the intensity difference table in which an intensity difference of the received wave between two of the antennas is associated with a received-wave arrival direction.

16. A direction detection method of detecting a received-wave arrival direction of a received wave by the direction detection device according to claim 1, the method comprising:
receiving the received wave by the plurality of antennas;
detecting, by the detector, an intensity difference between the two antennas and a phase difference between the two antennas, of the received wave to be received by the antennas;
extracting, by the extractor, from the intensity difference table stored in the storage unit, a received-wave arrival direction corresponding to the intensity difference detected by the detector, for each combination of any two of the antennas;
calculating, by the calculation unit, a received-wave arrival direction corresponding to the phase difference detected by the detector; and
comparing, by the comparator, the received-wave arrival direction extracted by the extractor with the received-wave arrival direction calculated by the calculation unit to acquire a matched received-wave arrival direction as a detection result.

17. A non-transitory computer-readable storage medium storing a direction detection program for detecting a received-wave arrival direction of a received wave, the direction detection program, when executed by a computer of the direction detection device according to claim 1, causing the direction detection device to:
receive the received wave by the plurality of antennas;
detect an intensity difference between the two antennas and a phase difference between the two antennas, of the received wave to be received by the antennas;
extract, from the intensity difference table stored in the storage unit, a received-wave arrival direction corresponding to the detected intensity difference, for each combination of any two of the antennas;
calculate a received-wave arrival direction corresponding to the phase difference detected by the detector; and
compare the extracted received-wave arrival direction with the calculated received-wave arrival direction to acquire a matched received-wave arrival direction as a detection result.

* * * * *